United States Patent [19]

Tanigami et al.

[11] Patent Number: 5,574,102
[45] Date of Patent: Nov. 12, 1996

[54] IMPACT-RESISTANT COMPOSITION

[75] Inventors: Hajime Tanigami, Osaka; Hiroshi Mashima, Chiba; Makoto Ozaki, Kanagawa, all of Japan

[73] Assignee: Nippon Paint Co., Ltd., Osaka, Japan

[21] Appl. No.: 63,563

[22] Filed: May 19, 1993

[30] Foreign Application Priority Data

May 27, 1992 [JP] Japan ................................. 4-160137
Jun. 19, 1992 [JP] Japan ................................. 4-272339

[51] Int. Cl.$^6$ .................... C08G 18/80; C08G 18/42; C08L 75/06; C08F 8/30
[52] U.S. Cl. .................... 525/124; 524/590; 524/591; 524/839; 525/127; 525/329.9; 525/330.5; 525/440; 525/457; 525/458; 525/528; 528/45; 528/60; 528/65; 528/66; 528/73; 528/80; 528/83
[58] Field of Search .................... 525/124, 127, 525/440, 457, 458, 528, 329.9, 330.5; 528/45, 60, 65, 66, 73, 80, 83; 524/590, 591, 839

[56] References Cited

U.S. PATENT DOCUMENTS

| | | | |
|---|---|---|---|
| 3,931,117 | 1/1976 | Leonard | 528/45 |
| 4,080,318 | 3/1978 | Smith et al. | 525/440 |
| 4,101,603 | 7/1978 | Smith et al. | 525/440 |
| 4,430,131 | 2/1984 | Tremblay | 524/284 |
| 4,444,955 | 4/1984 | Mels et al. | 525/124 |
| 4,701,502 | 10/1987 | Kordomenos et al. | 525/449 |
| 4,722,969 | 2/1988 | Huynh-Tran et al. | 528/45 |
| 4,785,068 | 11/1988 | Tominaga et al. | 528/45 |
| 4,824,925 | 4/1989 | Kamarchik, Jr. et al. | 528/45 |
| 4,824,926 | 4/1989 | O'Dwyer et al. | 528/65 |
| 4,865,704 | 9/1989 | Saatweber et al. | 523/403 |
| 4,888,244 | 12/1989 | Masubuchi et al. | 428/416 |
| 4,948,829 | 8/1990 | Mitsuji et al. | 524/591 |
| 4,981,759 | 1/1991 | Nakatani et al. | 428/626 |
| 4,985,500 | 1/1991 | Yamamoto et al. | 525/123 |
| 5,021,502 | 6/1991 | Patzchke et al. | 528/45 |
| 5,066,689 | 11/1991 | Patzschke et al. | 523/415 |
| 5,074,979 | 12/1991 | Valko et al. | 528/45 |
| 5,232,988 | 8/1993 | Venham et al. | 525/124 |
| 5,243,011 | 9/1993 | Panandiker et al. | 528/45 |

FOREIGN PATENT DOCUMENTS

| | | |
|---|---|---|
| 61-36995 | 8/1986 | Japan . |
| 62-61675 | 3/1987 | Japan . |
| 62-129184 | 6/1987 | Japan . |
| 62-169869 | 7/1987 | Japan . |
| 63-43967 | 2/1988 | Japan . |
| 1-197569 | 8/1989 | Japan . |

OTHER PUBLICATIONS

Dertel; *Polyurethane Handbook: Chemistry–Raw Materials–Processing–Applications–Properties;* Hansen Publishers; New York; 1985; p. 103.
WPI Abstract Accession No. 90–380905/51 & JP020276878 A., May 11, 1989.

*Primary Examiner*—James J. Seidleck
*Assistant Examiner*—Rabon Sergent
*Attorney, Agent, or Firm*—Foley & Lardner

[57] ABSTRACT

An impact-resistant composition is disclosed, comprising (A) a modified polyisocyanate in which the active isocyanate groups have been blocked, obtained from a polycaprolactone-modified diol and an isocyanate compound, and (B) a hydroxyl group-containing resin containing two or more hydroxyl groups per molecule. The composition is useful as a coating composition for forming a chipping-resistant coated film.

20 Claims, No Drawings

IMPACT-RESISTANT COMPOSITION

FIELD OF THE INVENTION

The present invention relates to a coating composition for forming a chipping-resistant coated film and a method for forming a chipping-resistant coated film. More particularly, this invention relates to an impact-resistant composition for use in the coating of outside plates of automotive body which is capable of preventing coated film damages due to small stones sprung by motor traffic and of preventing the substrate plates from rusting due to such coated film damages, and to a method for forming the chipping-resistant coated film.

BACKGROUND OF THE INVENTION

When an automobile is running at a high speed, collisions of small stones or the like against outside plates (strictly speaking, coated film surfaces) of the automobile are unavoidable. Accordingly, the collisions form cracks on the coated films or peel off the coated films from the substrates such as outside plates or other parts (so-called chipping is generated). If the chipping is generated on the coated film, water, etc., is permeated through the resulting flaw to form rust on the surface of the substrate (outside plate).

In particular, in such regions as the northern part of the U.S., Canada, and northern Europe, where rock salt and sand are scattered in large quantities on roads for the purpose of melting snow in the winter season, it is highly important for the coated films on outside plates of automotive body to have chipping resistance (i.e., impact resistance). Thus, it is desired to obtain a coated film which, even when small stones collide against it, does not suffer damages (chipping) and protects the substrate (outside plates of automotive body) against rusting.

The coating of outside plates of automotive body is generally conducted by a method in which a steel plate that has been chemical-treated with iron or zinc phosphate is coated successively with an electrodeposition coating paint (undercoating paint), an intermediate coating paint, and a topcoating paint. In order to improve chipping resistance and rust-preventive properties, various improvements have so far been proposed on electrodeposition coating paints (undercoating paints), intermediate coating paints, and topcoating paints and on coating methods therefor.

For example, JP-A-62-129184 (the term "JP-A" as used herein means an "unexamined published Japanese patent application") discloses a method for forming an anticorrosive coated film which comprises applying an electrodeposition coating paint on a steel plate, subsequently applying thereon an anticorrosive pigment-containing organic solvent-based coating paint (i.e., barrier coating paint) capable of forming a coated film having an elongation at break of 150% or higher and a stress at break of 20 kg/cm$^2$ or higher, and then applying thereon an intermediate coating paint and a topcoating paint at a total thickness of at least 30 μm on a dry basis, at least one of the intermediate coating paint or the topcoating paint being capable of forming a cured coated film having an elongation at break of 40% or lower and a stress at break of 300 kg/cm$^2$ or higher. The barrier coat comprises a thermoplastic or thermosetting resin such as a thermosetting polyester resin composition, a thermoplastic polyurethane elastomer, a polybutadiene-containing cross-linking-curable resin composition, a styrene-butadiene copolymer, a vinyl acetate-ethylene copolymer, butyl rubber, or the like.

U.S. Pat. No. 4,985,500 (corresponding to JP-A-62-169869) discloses a primer composition consisting essentially of (A) at least one resin having a glass transition temperature of not higher than −20° C. and an elongation at break of not less than 400% at 20° C., said resin being selected from the group consisting of polyolefin resin, polyacrylic resin, polyester resin, and modified resins thereof comprising linear high molecular weight elastomer; and (B) at least one cross-linking resin selected from the group consisting of melamine resin, urea resin, polyisocyanate, and blocked isocyanate;

wherein a weight ratio as a solid resin content of component (A) to component (B) is 70-99:30-1.

That is, U.S. Pat. No. 4,985,500 discloses a primer composition obtained by a combination of a resin such as polyurethane resin, polyacrylic resin, polyvinyl resin, etc. and a hardener such as melamine resin, urea resin, polyisocyanate, etc.

JP-A-1-197569 discloses a coating composition which contains, as major components, (A) a urethane polymer which has been obtained by reacting (i) a diisocyanate compound with (ii) a compound having 2 to 3 hydroxyl groups per one molecule on the average and has a number-average molecular weight of 5,000 to 50,000 and a hydroxyl value of 20 to 80;

(B) an oil-free polyester resin which has been obtained by reacting a polybasic acid component other than a saturated alicyclic polybasic acid and tetrahydrophthalic acid with a polyhydric alcohol component containing 5 to 60 mol % of diethylene glycol and/or triethylene glycol and has an average molecular weight of 800 to 3,500 and a hydroxyl value of 70 to 140; and (C) an alkyl-etherified melamine resin having a weight-average molecular weight of 3,000 or less, the amounts of components (A) and (C) being from 20 to 50% by weight and from 20 to 40% by weight, respectively, based on the total solid amount of components (A), (B), and (C), with the remainder being constituted by component (B), and which upon heating gives a cured coated film having a glass transition temperature of 10° C. or lower and an elongation as measured at −20° C. of 20% or higher.

Further, U.S. Pat. No. 4,888,244 (corresponding to JP-A-62-61675) discloses a method which comprises (i) forming a cationic electrodeposition coated film consisting mainly of a cationic resin having a functional group reactive to isocyanate group, and (ii) subsequently applying thereon an organic solvent-based coating paint which contains a polyisocyanate compound and forms a coated film having a static glass transition temperature of 0° to −75° C., followed by intermediate coating and topcoating. The preferred examples of the polyisocyanate compound which are enumerated in U.S. Pat. No. 4,888,244 (corresponding to JP-A-62-61675) include a product of reaction between hexamethylene diisocyanate and water, an adduct of xylylene diisocyanate with trimethylolpropane, an adduct of tolylene diisocyanate with hexamethylene diisocyanate, isophorone diisocyanate, hexamethylene diisocyanate, and lysine diisocyanate. In this prior-art method, such a polyisocyanate compound is used after being blocked with on ordinary blocking agent such as an oxime. As an example of the cationic resin having a functional group reactive to isocyanate group, a resin obtained by reacting an epoxy resin having a polyphenol with a cationic nature-imparting agent is given in the reference.

Furthermore, JP-B-61-36995 (the term "JP-B" as used herein means an "examined Japanese patent publication")

discloses a method in which a solvent-based, one-pack type composition comprising a blocked isocyanate compound having a specific isocyanate group content and a polyhydroxy compound having a specific hydroxyl group content as major components is applied on an undercoated film to form a soft urethane resin film. In JP-B-61-36995, there is a description to the effect that as the blocked isocyanate compound in the above composition for forming a soft urethane resin film, use can be made of a compound produced by blocking, with an alcohol or the like, the active isocyanate groups of a polyisocyanate obtained by the addition reaction of (a) a polyisocyanate such as hexamethylene diisocyanate or the like (in an excess amount) with (b) a low-molecular polyol such as ethylene glycol, propylene glycol, 1,3-butylene glycol, neopentyl glycol, trimethylolpropane, or the like. In Examples given in the reference, a compound obtained by blocking hexamethylene diisocyanate with both methanol and 1,6-hexanediol or a compound obtained by blocking hexamethylene diisocyanate/biuret-type polyisocyanate with n-butanol alone is used as the blocked isocyanate compound.

However, the coating compositions and coating methods described above are still insufficient in giving a coated film having satisfactory chipping resistance. In addition, they still have problems concerning, for example, the efficiency of coating by the wet-on-wet method.

JP-A-63-43967 discloses a chipping-resistant coating paint containing, as major components, (a) an organic solvent-soluble urethane polymer which is an adduct of a diisocyanate compound with a polyol having 2 to 3 hydroxyl groups per one molecule on the average and has a number-average molecular weight of 10,000 to 100,000, (b) a hydroxyl group-containing resin having a specific number-average molecular weight, and (c) a blocked polyisocyanate compound. In JP-A-63-43967, polyester resins and polyethers are given as preferred examples of the hydroxyl group-containing resin as component (b). As examples of the blocked isocyanate compound (c), diisocyanates such as hexamethylene diisocyanate, isophorone diisocyanate, and tolylene diisocyanate and adducts of these diisocyanates with a polyol compound are given in the reference. As the polyol compound, polyether polyols and (hydroxyl group-containing) polyester resins are given therein. In Examples given in the reference, a compound obtained by blocking, with an oxime, an adduct of tolylene diisocyanate with both poly(tetramethylene glycol) and trimethylolpropane or an adduct of tolylene diisocyanate with trimethylolpropane is used as the blocked isocyanate compound (c).

However, since the coating paint of JP-A-63-43967 contains a resin component having a relatively high molecular weight (component (a) has a number-average molecular weight of 10,000 to 100,000), the coating paint gives a coated film having insufficient surface smoothness or it is necessary to use a large amount of solvent in order to attain surface smoothness. Use of a solvent in a large amount, however, is undesirable from the standpoints of environmental problem, economy, etc.

SUMMARY OF THE INVENTION

Accordingly, an object of the present invention is to provide an impact-resistant composition which gives a coated film having good chipping resistance and prevented from occurring soak in an intermediate coated film (i.e., from dissolving an intermediate coated film), which can be formulated to have a lower volatile content (solvent content), and which enables the cleaning of the piping, coating machine, etc. in the coating line and the removal of coated films from the equipment to be conducted easily.

Another object of the present invention is to provide a coating method for forming a coated film having good chipping resistance.

Further object of the present invention is to provide a coated article having a multi-layered coated film formed by coating an automotive body with a method for forming a good chipping-resistant coated film comprising an excellent impact-resistant composition.

In view of the above-described objects, the present inventors made intensive studies on impact-resistant compositions containing a hydroxyl group-containing resin and a modified polyisocyanate compound as major components. As a result, they have found that when (A) a modified polyisocyanate obtained from polycaprolactone-modified diol and an isocyanate compound in which the active isocyanate groups have been blocked is combined with (B) a hydroxyl group-containing resin containing two or more hydroxyl groups per one molecule, a composition providing a coated film having excellent chipping resistance can be obtained. It has also been found that this coating composition is applicable not only to a coating process comprising electrodeposition coating and topcoating but also to a coating process comprising electrodeposition coating, intermediate coating, and topcoating, and that when used in the latter coating process, the composition can be prevented from occurring soak in an intermediate coated film during the coating operation and gives a good coated film. The present invention is based on the above findings.

The present invention provides an impact-resistant composition comprising as major components, (A) a modified polyisocyanate obtained from polycaprolactone-modified diol and an isocyanate compound in which the active isocyanate groups have been blocked and (B) a hydroxyl group-containing resin containing two or more hydroxyl groups per one molecule.

The present invention further provides a method for forming a chipping-resistant coated film which comprises applying the above-described impact-resistant composition in either (1) a coating process comprising electrodeposition coating, intermediate coating, and topcoating, to form at least one coated film selected from the group consisting of (a) to (e):

(a) a coated film disposed between an electrodeposited coated film and an intermediate coated film, (b) a coated film disposed between an intermediate coated film and a topcoated film, (c) a topcoated film when the topcoated film is of a one-layer type, (d) a base coated film and/or clear coated film of a topcoating when the topcoated film is of a two-layer type, and (e) an intermediate coated film; or (2) a coating process comprising electrodeposition coating and topcoating to form at least one coated film selected from the group consisting of (f) to (h):

(f) a coated film disposed between an electrodeposited coated film and a topcoated film, (g) a topcoated film when the topcoated film is of a one-layer type, and (h) a base coated film and/or clear coated film of a topcoating when the topcoated film is of a two-layer type.

The present invention furthermore provides a coated article having a multi-layered coated film formed by coating an automotive body using the above-described impact-resistant composition with the above-described, chipping-resistant coated film-forming method.

DETAILED DESCRIPTION OF THE INVENTION

The impact-resistant composition of the present invention comprises, as major components, (A) a modified polyisocyanate obtained from polycaprolactone-modified diol and a isocyanate compound in which the active isocyanate groups have been blocked and (B) a hydroxyl group-containing resin containing two or more hydroxyl groups per one molecule.

Preferably, the impact-resistant composition of the present invention further contain (C) polycaprolactone-modified diol.

(A) Modified Polyisocyanate (Compound)

The polyisocyanate (compound) (A) is one in which polycaprolactone-modified diol has been bonded to a polyisocyanate preferably of the aliphatic or alicyclic type and the excess isocyanate groups have been blocked with a blocking agent that will be described later. The polyisocyanate more preferably is aliphatic type.

Examples of the aliphatic or alicyclic polyisocyanate include hexamethylene diisocyanate (hereinafter referred to as HDI), lysine diisocyanate, trimethylhexamethylene diisocyanate, and isophorone diisocyanate. Further, polymers of these polyisocyanates are also usable. In particular, it is preferred to use HDI and/or a polymer thereof.

These aliphatic polyisocyanates may be of any type selected from the adduct type in which a polyhydric alcohol or the like has added, the biuret type, and the isocyanurate type. Of these, aliphatic polyisocyanates of the biuret or isocyanurate-type are preferred, with biuret-type ones being especially preferably used. By use of a biuret-type polyisocyanate, a coated film which is soft and has good chipping resistance can be obtained. Use of an isocyanurate-type polyisocyanate does not contribute to coated film chipping resistance because of the presence of a cyclic structure in the backbone of the polyisocyanate. However, even an isocyanurate-type polyisocyanate compound can give a sufficiently pliable coated film since in the present invention, a polycaprolactone backbone is incorporated into the polyisocyanate molecular chain as described below.

In the present invention, for example, an aliphatic polyisocyanate such as those enumerated above is used after being modified with polycaprolactone-modified diol. Specifically, a polycaprolactone backbone is incorporated between backbones of an aliphatic polyisocyanate thereby to form a soft moiety between the molecular chains of the polyisocyanate compound. In the case of using a biuret-type polyisocyanate to prepare component (A), this component (A) is a compound raising a considerably pliability because the polyisocyanate itself has no cyclic structure and because the substance (polycaprolactone moiety) that has added the polyisocyanate basically has a straight-chain structure. Since the hydroxyl group-containing resin (component (B)) that will be described later is crosslinked and cured with such a compound (polyisocyanate compound), the thus-obtained coated film has good chipping resistance.

It is preferred that in component (A) (the polyisocyanate compound to which polycaprolactone has been bonded), the proportion of the moiety derived from the polyisocyanate (e.g., HDI moiety) to the polycaprolactone moiety be from 1/1 to 1/10 by weight and particularly from 1/1 to 1/4 by weight.

Examples of the blocking agent for use in blocking the active isocyanate groups of the polyisocyanate compound include oximes, lactams such as ε-caprolactam, phenols such as phenol and xylenol, and alcohols. Of these, oximes are preferably used as the blocking agent. Specific examples of the oximes for use as the blocking agent include MEK oxime and acetaldoxime.

In component (A), the number of isocyanate groups (—NCO groups, which have been blocked with the blocking agent described above) is preferably from 2 to 5 and particularly preferably from 2 to 3, per one molecule of the polyisocyanate compound.

It is also preferable that the number-average molecular weight of component (A) (the modified polyisocyanate compound to which polycaprolactone-modified diol has been bonded) be about from 1,000 to 5,000, with the more preferred range thereof being from 1,000 to 3,000.

(B) Hydroxyl Group-Containing Resin

In the present invention, a resin having two or more hydroxyl groups per one molecule is used as the hydroxyl group-containing resin. Usable examples of the hydroxyl group-containing resin include:

(i) a hydroxyl group-containing acrylic resin, (ii) a hydroxyl group-containing polyester resin, (iii) a diol of an aliphatic hydrocarbon having 2 to 8 carbon atoms, and (iv) a hydroxyl group-containing epoxy resin. Of these, a hydroxyl group-containing acrylic resin and a hydroxyl group-containing polyester resin are preferred. Particularly, a hydroxyl group-containing acrylic resin is preferred.

(i) Hydroxyl Group-Containing Acrylic Resin

As the hydroxyl group-containing acrylic resin, one having a glass transition temperature ($T_g$) of −50° to 0° C. is preferably used.

The acrylic resin can be produced from, for example, the following monomers by an ordinary polymerization method. That is, examples of monomers include:

(1) hydroxyl group-containing ethylenic monomers such as hydroxymethyl (meth)acrylate, hydroxyethyl (meth)acrylate, hydroxypropyl (meth)acrylate, hydroxybutyl (meth)acrylate, and N-methylolacrylamide;

(2) carboxyl group-containing ethylenic monomers such as acrylic acid, methacrylic acid (MAA), crotonic acid, itaconic acid, fumaric acid, and maleic acid; and (3) alkyl (meth)acrylates such as methyl (meth)acrylate, ethyl (meth)acrylate, propyl (meth)acrylate, butyl acrylate, isopropyl acrylate, isobutyl acrylate, 2-ethylhexyl acrylate, lauryl (meth)acrylate, n-octyl acrylate, and n-dodecyl acrylate.

The acrylic resin can be obtained by copolymerizing at least one of these compounds by an ordinary method (provided that at least one of the monomer(s) used should contain a hydroxyl group).

It is also possible to use, besides the above ethylenic monomers (1) to (3), an ethylenic monomer copolymerizable or polymerizable therewith, such as, e.g., styrene or (meth)acrylonitrile.

In the present invention, it is preferred to select at least one monomer from those enumerated above and to determine the amount thereof so that the acrylic resin to be constituted from the selected monomer(s) have a glass transition temperature ($T_g$) of −50° to 0° C.

For example, the acrylic monomers are divided into those whose homopolymers form a coated film having a low glass transition temperature ($T_g$) of −10° C. or lower (hereinafter referred to simply as "low-$T_g$ acrylic monomers") and those whose homopolymers form a coated film having a high glass transition temperature ($T_g$) (hereinafter referred to simply as "high-$T_g$ acrylic monomers"), and this classification is taken in account when regulating monomer ratio.

The low-$T_g$ acrylic monomers include ethyl acrylate, n-butyl acrylate, 2-ethylhexyl acrylate, lauryl methacrylate, 4-hydroxybutyl acrylate, and 2-hydroxyethyl acrylate. The homopolymers of these monomers give coated films respectively having the following glass transition temperatures ($T_g$).

| | |
|---|---|
| Ethyl acrylate (EA) | −22° C. |
| n-Butyl acrylate (n-BA) | −54° C. |
| 2-Ethylhexyl acrylate (2-EHA) | −85° C. |
| Lauryl methacrylayte (LMA) | −65° C. |
| 4-Hydroxybutyl acrylate (4-HBA) | −43° C. |
| 2-Hydroxyethyl acrylate (2-HEA) | −15° C. |

The above values of glass transition temperature ($T_g$) are described in "Introduction to Synthetic Resins for Coatings" (published by Kobunshi Kanko Kai, Japan).

It is preferable that in synthesizing a hydroxyl group-containing acrylic resin, one or more of the above-enumerated low-$T_g$ acrylic monomers be used as an essential ingredient with a high-$T_g$ acrylic monomer given below being suitably added thereto. The content of low-$T_g$ acrylic monomer(s) in the acrylic resin is preferably from 50 to 95% by weight. If the low-$T_g$ acrylic monomer content is below 50% by weight, high elongation cannot be imparted to the coated film obtained. If the content thereof exceeds 95% by weight, the necessary tensile strength cannot be obtained. The more preferred range of the content thereof is from 60 to 90% by weight.

On the other hand, the high-$T_g$ acrylic monomers include acrylic acid, methacrylic acid, such alkyl (meth)acrylates as methyl acrylate, isopropyl acrylate, hydroxypropyl acrylate, methyl methacrylate, ethyl methacrylate, isopropyl methacrylate, n-butyl methacrylate, n-hexyl methacrylate, 2-hydroxyethyl methacrylate, and hydroxypropyl methacrylate, styrene (St), and acrylonitrile.

The content of such high-$T_g$ acrylic monomer(s) in the acrylic resin is preferably 40% by weight or lower. If the content thereof exceeds 40% by weight, the coated film to be obtained has an insufficient elongation. The more preferred range of the content thereof is from 5 to 30% by weight.

Although it is preferred to synthesize an acrylic resin from one or more monomers suitably selected from those enumerated above so as to result in a $T_g$ of −50° to 0° C., the monomer selection more preferably is conducted so as to produce an acrylic resin giving a coated film having a $T_g$ of −40° to −15° C.

It is preferable that the number-average molecular weight of the acrylic resin described above be from 2,000 to 8,000. If the number-average molecular weight of the resin is below 2,000, the coated film is crosslinked insufficiently to have poor properties. On the other hand, if the number-average molecular weight thereof exceeds 8,000, a coated film having excellent chipping resistance cannot be obtained and it becomes difficult to formulate a high-solid coating composition using the acrylic resin. The number-average molecular weight of the acrylic resin is more preferably from 2,500 to 6,000, with the most preferred range thereof being from 3,000 to 4,000.

The hydroxyl value of the acrylic resin is preferably from 50 to 200. If the hydroxyl value thereof is below 50, low chipping resistance results. On the other hand, if it exceeds 200, the coated film has insufficient pliability and hence has poor chipping resistance. The more preferred range of the hydroxyl value of the acrylic resin is from 140 to 180.

The acid value of the acrylic resin is preferably from 1 to 10. If the acid value thereof is below 1, the coated film shows poor adhesion. On the other hand, if it exceeds 10, the coating composition has poor storage stability. In the present invention, the units of hydroxyl value and acid value are mgKOH/g.

The acrylic resin described above may be used after being modified with a lactone, which preferably is ε-caprolactone. It is preferable that this lactone-modified acrylic resin have a number-average molecular weight of 4,000 to 15,000.

(ii) Hydroxyl Group-Containing Polyester Resin

The polyester resin that can be used in this invention is one having two or more hydroxyl groups per one molecule and generally called a polyester polyol. This polyester resin is usually obtained by the polycondensation (esterification reaction) of a polyhydric alcohol with a polybasic acid or anhydride thereof.

Examples of the polyhydric alcohol include ethylene glycol, diethylene glycol, polyethylene glycol, propylene glycol, dipropylene glycol, polypropylene glycol, neopentyl glycol, 1,2-butanediol, 1,3-butanediol, 2,3-butanediol, 1,4-butanediol, 1,5-pentanediol, 1,6-hexanediol, hydrogenated bisphenol A, a hydroxyalkylated bisphenol A, 1,4-cyclohexanedimethanol, 2,2-dimethyl-3-hydroxypropyl-2,2-dimethyl-3-hydroxypropionate, 2,2,4-trimethyl-1,3-pentanediol, N,N-bis(2-hydroxyethyl)dimethylhydantoin, polytetramethylene ether glycol, polycaprolactone polyol, glycerin, sorbitol, anisole, trimethylolethane, trimethylolpropane, trimethylolbutane, hexanetriol, pentaerythritol, dipentaerythritol, and tris(hydroxyethyl) isocyanate. It is also possible to use a combination of two or more of the above-enumerated polyhydric alcohols.

Examples of the polybasic acid or anhydride thereof include phthalic acid, phthalic acid anhydride, tetrahydrophthalic acid, tetrahydrophthalic acid anhydride, hexahydrophthalic acid, hexahydrophthalic acid anhydride, methyltetrahydrophthalic acid, methyltetrahydrophthalic acid anhydride, Himic acid anhydride, trimellitic acid, trimellitic acid anhydride, pyromellitic acid, pyromellitic acid anhydride, isophthalic acid, terephthalic acid, maleic acid, maleic acid anhydride, fumaric acid, itaconic acid, adipic acid, azelaic acid, sebacic acid, succinic acid, succinic acid anhydride, lactic acid, dodecenylsuccinic acid, dodecenylsuccinic anhydride, cyclohexane-1,4-dicarboxylic acid, and endic acid anhydride. It is also possible to use a combination of two or more thereof.

The polyester resin for use in the present invention can be obtained by reacting such a polyhydric alcohol as those enumerated above with such a polybasic acid or anhydride thereof as those enumerated above in such a proportion that the molar ratio of the hydroxyl groups of the former to the carboxyl groups of the latter is from 1.2 to 1.8, and it has two or more residual hydroxyl groups per one molecule as described above.

It is preferable that the number-average molecular weight of the hydroxyl group-containing polyester resin be from 500 to 10,000. The hydroxyl value of the resin is preferably from 40 to 200 and particularly preferably from 70 to 180, while the acid value thereof is preferably from 2 to 40.

The hydroxyl group-containing polyester resin may be used after being modified with a lactone, an oil or fat or a fatty acid, a melamine resin, an epoxy resin, a urethane resin, etc.

Preferred examples of the lactone-modified polyester resin (i.e., hydroxyl group-containing polyester resin modified with a lactone; each of the other modified polyester resins described below also contains hydroxyl groups) include those modified with a lactone having 6 to 8 carbon atoms in the ring. Examples of the modifying lactone include ε-caprolactone. Further, lactone compounds formed by bonding an alkyl group, alkoxyl group, cycloalkyl group, phenyl group, benzyl group, or the like to a ring carbon atom of those lactones are also usable.

The preferred range of the number-average molecular weight of the lactone-modified polyester resin is from 500 to 15,000, while that of the hydroxyl value thereof is preferably from 1 to 200, more preferably from 3 to 100 and most preferably from 5 to 40.

The lactone-modified polyester resin can be produced by adding a desired lactone to a polyester resin and heating the mixture. It is preferred to use in this reaction a tin compound and/or an organic acid salt of lead or manganese as a catalyst.

Examples of the oil-modified polyester resin include those obtained by modifying the above-described polyester resin with oils or fats, e.g., castor oil, dehydrated castor oil, coconut oil, corn oil, cottonseed oil, linseed oil, perilla oil, poppy seed oil, safflower oil, soybean oil, and tung oil, or with fatty acids extracted from these fats and oils.

The preferred range of the number-average molecular weight of the oil-modified polyester resin (oil-, fat-, or fatty acid-modified polyester resin) is from 500 to 15,000, while that of the hydroxyl value thereof is preferably from 40 to 200 and particularly preferably from 70 to 160.

In producing the oil-modified polyester resin, it is preferred to add such an oil or fat and/or fatty acid as those enumerated above to a polyester resin in a total amount of up to 30 parts by weight per 100 parts by weight of polyester resin.

Examples of the melamine resin for use in modifying a polyester resin include those obtained by adding an aliphatic aldehyde to melamine and then etherifying the adduct. Particularly preferred is one obtained by etherifying a melamine-formaldehyde adduct. Specific examples of the melamine resins obtained by etherifying melamine-aliphatic aldehyde adducts include condensates of methyl-etherified melamine, methylbutyl-etherified melamine, butyl-etherified melamine, and the like. Further, resins obtained by etherifying condensates of benzoguanamine, urea, or the like with aliphatic aldehydes are also usable.

The preferred range of the number-average molecular weight of the melamine-modified polyester resin is from 500 to 15,000, while that of the hydroxyl value thereof is preferably from 40 to 200 and particularly from 70 to 160. In producing the melamine-modified polyester resin, it is preferred to add a melamine resin to a polyester resin in an amount of 1 to 10 parts by weight per 100 parts by weight of the polyester resin.

As the epoxy resin for use in modifying a polyester resin, one ordinarily used in the field of coatings can be employed. Examples thereof include bisphenol epoxy resins such as Epikote 828, 834, 836, 1001, 1004, 1007, and DX-225 (manufactured by Shell Chemical Co., Ltd., Japan), Araldite GY-260, 6071, and 6084 (manufactured by Ciba-Geigy A. G.) DER-330, 331, 660, 661, and 66 (manufactured by The Dow Chemical Co.), and Epiclon 800, 830, 850, 860, 1050, and 4050 (manufactured by Dainippon Ink & Chemicals, Inc., Japan), phenol novolak epoxy resins such as DEN-431 and 438 (manufactured by The Dow Chemical Co.), polyglycol-type epoxy resins such as Araldite CT508 (manufactured by Ciba-Geigy A. G.) and DER 732 and 736 (manufactured by The Dow Chemical Co.), ester-type epoxy resins, chain aliphatic epoxy resins, alicyclic epoxy resins, and polyol-type epoxy resins. The above-enumerated epoxy resins each may contain a halogen.

The preferred range of the number-average molecular weight of the epoxy-modified polyester resin is from 500 to 15,000, while that of the hydroxyl value thereof is preferably from 50 to 200 and particularly preferably from 70 to 160. In producing the epoxy-modified polyester resin, it is preferred to add an epoxy resin to a polyester resin in an amount of from 1 to 50 parts by weight per 100 parts by weight of the polyester resin.

The urethane-modified polyester resin is a resin having a polyester moiety and a urethane moiety. This resin is obtained by reacting the isocyanate groups of a polyisocyanate compound with hydroxyl groups of a polyester resin to incorporate urethane bonds into the resin, or by bonding a dibasic acid to hydroxyl groups of a urethane which is a product of the reaction of a polyol and a polyisocyanate. In either case, the modified polyester resin has two or more residual hydroxyl groups per one molecule.

The polyisocyanate compound to be bonded to hydroxyl groups of a polyester resin through urethane bond in the production of the urethane-modified polyester resin is a compound having two or more free isocyanate groups per one molecule. Examples thereof include tolylene diisocyanate, 4,4'-diphenylmethane diisocyanate, xylylene diisocyanate, m-xylylene diisocyanate, hexamethylene diisocyanate, lysine diisocyanate, hydrogenated 4,4'-diphenylmethane diisocyanate, hydrogenated tolylene diisocyanate, isophorone diisocyanate, trimethylhexamethylene diisocyanate, and dimer acid diisocyanates. In addition, urethane compounds obtained by reacting small amounts of polyols with polyisocyanate compounds are included in the polyisocyanate compound for use herein, as long as such urethane compounds each contains two or more isocyanate groups per one molecule. Examples of such urethane compounds include an adduct of tolylene diisocyanate (3 mol) with trimethylolpropane (1 mol), an adduct of hexamethylene diisocyanate (3 mol) with trimethylolpropane (1 mol), a reaction product of hexamethylene diisocyanate with water, and an adduct of xylylene diisocyanate (3 mol) with trimethylolpropane (1 mol). One or more compounds are selected from these and used.

Preferred of the above-enumerated polyisocyanate compounds are those of the non-yellowing type having excellent weatherability and other properties, such as a reaction product of hexamethylene diisocyanate with water, an adduct of hexamethylene diisocyanate with trimethylolpropane, an adduct of xylylene diisocyanate with trimethylolpropane, isophorone diisocyanate, hexamethylene diisocyanate, lysine diisocyanate, and the like.

The preferred range of the number-average molecular weight of the urethane-modified polyester resin is from 500 to 15,000, while that of the hydroxyl value thereof is preferably from 50 to 200 and particularly preferably from 70 to 160.

In the present invention, a hydroxyl group-containing polyester resin modified with a phenolic resin can also be used.

(iii) Polyol having 2–8 Carbon Atoms and Polycaprolactonediol

An aliphatic polyol having 2 to 8 carbon atoms can be used as component (B) in the present invention. Examples thereof include ethylene glycol, propylene glycol, butylene glycol, 1,5-pentanediol, 1,6-hexanediol, 2-ethyl-1,3-hexanediol, and neopentyl glycol. In addition, polycaprolactonediol or the like is also usable.

In the case of using polycaprolactonediol, the preferred range of the number-average molecular weight thereof is from 200 to 5,000.

(iv) Hydroxyl Group-Containing Epoxy Resin

Examples of the epoxy resin having two or more hydroxyl groups include various kinds of bisphenol epoxy resins.

The preferred range of the number-average molecular weight of the hydroxyl group-containing epoxy resin is from 300 to 5,000, while that of the hydroxyl value thereof is preferably from 50 to 200 and particularly preferably from 70 to 160.

Such epoxy resins may also be used after being modified with a lactone. In the case of modifying an epoxy resin with a lactone, it is preferred to add the lactone in an amount of 5 to 50 parts by weight per 100 parts by weight of the epoxy resin.

(v) Other Resins

Together with the hydroxyl group-containing resin (B) described above, an amine containing plurality of active hydrogen atoms may be further used. Examples of the amine include polyoxyalkylamines, polyamidoamines, and aliphatic or aromatic amines (polyamines) having two or more amino groups per one molecule. A specific example of the polyoxyalkylamines is Jeffamine (manufactured by Texaco Chemical Co.).

It is preferable that the amount of the modified polyisocyanate, component (A), and that of the hydroxyl group-containing resin, component (B), to be blended be from 20 to 80 parts by weight and from 80 to 20 parts by weight, respectively, in terms of solid amount. If the amount of component (A) is below 20 parts by weight or larger than 80 parts by weight, the chipping resistance is deteriorated. The more preferred range of component (A) amount is from 30 to 70 parts by weight, and that of component (B) amount is from 70 to 30 parts by weight.

The two components may be blended in such a proportion that the molar ratio of isocyanate groups (—NCO) in component (A) to hydroxyl groups (—OH) in component (B) (i.e., —NCO/—OH ratio) is preferably (40–60)/(60–40) and particularly preferably (45–55)/(55–45). When components (A) and (B) are blended in a proportion within that range, a good cured film is obtained.

Preferably, the impact resistant composition of the present invention further contains (C) a polycaprolactone-modified diol in an amount of from 25 to 80 parts by weight per 100 parts by weight of components (A) and (B).

Examples of the polycaprolactone-modified diol as component (C) which is preferably used include lactone-modified polyester resins as described above, acrylic resins modified with a lactone as described above, and polyols having 2 to 8 carbon atoms and polycaprolactonediols as described above.

Besides the essential components described above, fine particles of a crosslinked-polymer, a pigment, and various additives all of which will be described below may be incorporated into the impact-resistant composition of the present invention.

Incorporation of crosslinked-polymer fine particles brings about an improved coated film appearance and prevents the chipping-resistant coated film from occurring soak in the coated film disposed thereon.

Various processes have so far been proposed for producing crosslinked-polymer fine particles (fine resin particles). Among those is a process in which an ethylenically unsaturated monomer is polymerized with a crosslinking comonomer in an aqueous medium by means of suspension polymerization or emulsion polymerization to prepare a dispersion of fine resin particles and the water is then removed by solvent replacement, azeotropy, centrifugation drying, etc. to obtain the fine resin particles. In another process, an ethylenically unsaturated monomer is copolymerized with a crosslinking comonomer in a low-SP organic solvent, such as an aliphatic hydrocarbon, or in a high-SP organic solvent that dissolves the monomers but does not dissolve the polymer to be produced, such as an ester, ketone, or alcohol, thereby to obtain fine polymer particles (copolymer) as a dispersion. The latter process is called the NAD method or precipitation method.

Crosslinked-polymer fine particles (fine resin particles) may be produced by either of the above processes. Alternatively, the method described in JP-A-58-129066 may be employed which uses a water-soluble resin having a group that is amphoteric with respect to ionization.

It is preferable in this invention to employ crosslinked-polymer fine particles (fine resin particles) having an average particle diameter of 0.01 to 10 μm and particularly 0.01 to 0.1 μm.

Examples of the ethylenically unsaturated monomer for use in producing crosslinked-polymer fine particles (fine resin particles) include alkyl esters of acrylic or methacrylic acid, such as methyl (meth)acrylate, ethyl (meth)acrylate, n-butyl (meth)acrylate, isobutyl (meth)acrylate, and 2-ethylhexyl (meth)acrylate, and other monomers having an ethylenically unsaturated bond and copolymerizable with these (meth)acrylates, such as styrene, α-methylstyrene, vinyltoluene, t-butylstyrene, ethylene, propylene, vinyl acetate, acrylonitrile, methacrylonitrile, and dimethylaminoethyl (meth)acrylate. These monomers may be used as a mixture of two or more thereof.

The crosslinking comonomer for use here include a monomer having, per one molecule, two or more ethylenically unsaturated bonds capable of undergoing radical polymerization and/or an ethylenically unsaturated group-containing monomer having groups capable of reacting with each other.

Examples of the monomer having, per molecule, two or more ethylenically unsaturated bond groups capable of undergoing radical polymerization include esters of polyhydric alcohols with polymerizable unsaturated monocarboxylic acids, esters of polybasic acids with polymerizable unsaturated alcohols, and aromatic compounds each having two or more vinyl groups.

Although the fine resin particles produced in an aqueous medium or in a nonaqueous organic medium may be used as they are, the particles may be isolated by filtration, spray drying, freeze drying, or other technique and used as they are or after being reduced to an adequate particle diameter with a mill or by other means.

Examples of the fine resin particles (i.e., the crosslinked-polymer fine particles) include AZS 797 and AZS 597 (both manufactured by Nippon Paint Co., Ltd.). The fine resin particles are contained in an amount of generally from 0.1 to 40% by weight, preferably from 0.5 to 30% by weight, especially preferably from 5 to 15% by weight based on the amount of the composition of this invention, in the composition.

Usable examples of the pigment include various kinds of organic pigments; inorganic pigments such as carbon black, titanium dioxide, and iron oxide; extender pigments such as barium sulfate and talc, and flaky pigments such as graphite.

It is also possible to add a surface modifier of the acrylic or polyoxyethylene type (e.g., Liponox NC-60, manufactured by Lion Fat & Oil Co., Japan) for the purpose of improving dust affinity.

In the present invention, it is desirable that a catalyst such as an organotin compound be added as a curing reaction accelerator to the coating composition. Examples of the tin compound include dimethyltin dilaurate, dibutyltin dilaurate, dimethyltin chloride, dibutyltin chloride, and di-n-octyltin dilaurate. A tertiary amine catalyst may be used in combination with such a tin compound catalyst.

A known anti-settling agent may be incorporated, such as one of the polyethylene or polyamide type or other type.

It is possible to use an amino resin in place of a part of component (A), which is a crosslinking ingredient.

The amounts of the above-described various additives to be incorporated are preferably as follows; the amount of a pigment is from 5 to 30 parts be weight, that of a catalyst is from 0.5 to 3 parts by weight, and that of an anti-settling agent is 1 part by weight or less, per 100 parts by weight of the total amount (solid amount) of the above-described essential components (A) and (B).

Therefore, the representative example of mixing ratio for the impact-resistant composition containing the additives described above is shown below.

| | | |
|---|---|---|
| Component (A) | 20 to 80 | parts by weight |
| Component (B) | 80 to 20 | " |
| Component (C)* | 25 to 80 | " |
| Fine resin particles* | 0.1 to 40 | " |
| Pigments* | 5 to 30 | " |
| Catalyst* | 0.5 to 3 | " |
| Total (Solid base) | 100 | parts by weight |
| (Organic) solvent | 50 to 200 | " |

*These additives are added, if necessary.

The impact-resistant composition of the present invention is dissolved or dispersed in an organic solvent or water to obtain a paint, lacquer, or coating solution which is generally called "chipping primer" or "chipping-protective primer" or "intermediate primer" or "barrier coat".

In the case where the impact-resistant composition of the present invention is to be used as an organic solvent-based coating paint usable examples of the solvent include aromatic hydrocarbons such as toluene and xylene, aliphatic hydrocarbons such as mineral spirit, esters such as ethyl acetate and butyl acetate, and ketones such as methyl ethyl ketone. One or more solvents may be suitably selected from those and used alone or as a mixture. Besides being used as an organic solvent-based coating paint, the impact-resistant composition of this invention can also be used as a water-based coating paint of the aqueous dispersion type. In this case, water or any of various hydrophilic organic solvents can be used as a solvent.

The impact-resistant composition of the present invention may be applied in either (1) a coating process comprising electrodeposition coating, intermediate coating, and topcoating to form at least one coated film selected from the group consisting of (a) to (e):
  (a) a coated film disposed between an electrodeposited coated film and an intermediate coated film,
  (b) a coated film disposed between an intermediate coated film and a topcoated film,
  (c) a topcoated film when the topcoated film is of a one-layer type,
  (d) a base coated film and/or clear coated film of a topcoating when the topcoated film is of a two-layer type, and
  (e) an intermediate coated film; or (2) a coating process comprising electrodeposition coating and topcoating to form at least one coated film selected from the group consisting of (f) to (h):
  (f) a coated film disposed between an electrodeposited coated film and a topcoated film,
  (g) a topcoated film when the topcoated film is of a one-layer type, and
  (h) a base coated film and/or clear coated film of a topcoated film when the topcoated film is of a two-layer type.

As a result, the multi-layered coated article (i.e., the coated article having a multi-layered coated film) of the present invention which has a chipping-resistant coated film can be obtained.

The coating processes employing the impact-resistant composition of the present invention will be explained below in detail.

(1) Application in Coating Process Comprising Electrodeposition Coating, Intermediate Coating, and Topcoating First, the steel substrate is subjected to electrodeposition coating. As the electrodeposition coating paint, any of the conventional ones of the anionic resin type and cationic resin type can be used.

Resins for use as the major components of electrodeposition coating paint include the following, which have been classified by structure: (1) those having the backbone of a drying oil or a liquid rubber such as polybutadiene or, in some cases, of a resin obtained by epoxidizing such an oil or rubber, e.g., maleic oil resins, maleic acid-modified polybutadiene resins, and amine-epoxidized polybutadiene resins; (2) those having the backbone of a fatty acid ester of a resinous polyol and those obtained by modifying such resins, e.g., epoxy resins and esterified resins; (3) those having the backbone of an alkyd resin; and (4) those having the backbone of an acrylic resin.

In the case where the resin to be used in the electrodeposition coating paint is an acid resin, it is preferred that the resin be neutralized with a base such as ammonia, an amine, or an inorganic alkali and then dissolved or dispersed in water. In the case of using a basic resin, it is preferred to neutralize the resin with an acid such as acetic acid, lactic acid, boric acid, or phosphoric acid and then dissolve or disperse the resulting resin in water.

Into the electrodeposition coating paint, ordinarily used additives may suitably be further incorporated, such as a crosslinking agent (e.g., a melamine resin or a blocked isocyanate), a pigment, and a solvent.

It is usually preferred that the electrodeposition coating be conducted so as to deposit a coated film having a thickness of 10 to 40 μm after baking. The other conditions for the electrodeposition coating may be the same as those for conventional electrodeposition coating processes.

It is also preferred that the ordinary chemical conversion be conducted prior to the electrodeposition coating.

In the case of (a) above, a coating paint obtained from the coating composition of the present invention is applied on an electrodeposited coated film.

For dissolving the impact-resistant composition of this invention in a suitable solvent to give a coating paint, it is necessary to well disperse and mix the components. This can be attained by using a mixing device for use in producing ordinary coating, such as a paint shaker, dissolver, ball mill, sand grinding mill, or the like.

The impact-resistant composition of the present invention is diluted with a solvent to a proper viscosity, and is applied by spraying, coating, or other technique. The viscosity of the impact-resistant composition is measured with #4 Ford cup. The viscosity of the composition for a spray coating method is adjusted to 10 to 30 seconds/20° C. with #4 Ford cup.

Preferred examples of the coating machine include those of the atomizer type such as an air spray, an airless spray, and an electrostatic coating machine.

It is preferable that the chipping-resistant coated film obtained from the composition of the present invention have a thickness of 2 to 60 µm on a dry basis. If the thickness of the chipping-resistant coated film is below 2 µm, the film has poor chipping resistance. If the thickness thereof exceeds 60 µm, a poor appearance results because in wet-on-wet coating, an overlying coated film and the underlying chipping-resistant coated film compatibility. The more preferred range of the thickness of the chipping-resistant coated film is from 5 to 40 µm.

Intermediate coating is then conducted. This intermediate coating for applying an intermediate coated film on the coated film obtained from the coating composition of this invention may be carried out by the so-called wet-on-wet method or by a combination thereof with the semi-bake (flash off a solvent from wet film) method.

As the intermediate coating paint, a coating paint of the alkyd resin, polyester resin, or acrylic resin type may be used. The intermediate coating may be applied by an ordinary method, e.g., electrostatic coating. Baking may also be performed in an ordinary manner. The thickness of the intermediate coated film is preferably from 20 to 60 µm on a dry basis.

A "colored intermediate coating paint" containing a coloring pigment may be used as the intermediate coating paint so as to give an attractive finish when combined with a topcoating paint.

Examples of the topcoating paint include coating paints of the acrylic resin, polyester resin, and fluororesin types. These may be any of the organic solvent-based type, water-based type, and powder type.

The conditions for topcoating may be the same as those for the conventional topcoating of automotive bodies.

In the case of (b) above, electrodeposition coating and baking are first conducted, followed by intermediate coating on the electrodeposited coated film and baking. Subsequently, a coating paint obtained from the coating composition of the present invention is applied on the intermediate coated film, and the topcoating is then conducted by the wet-on-wet method or by a combination thereof with the preheating method. In this case, it is preferred that the thickness of the coated film formed from the coating composition of this invention be about 2 to 60 µm on a dry basis. The conditions for each of the electrodeposition coating, intermediate coating, and topcoating may be the same as those in the case of (a) described above.

In the case of (c) above, the coating composition of the present invention is used as a one-layer type topcoating paint (so-called solid topcoating paint). After electrodeposition coating/baking and intermediate coating/baking have been conducted in the same manner as in the case of (a) described above, a coating paint obtained from he coating composition of this invention is applied on the intermediate coated film.

When the coating composition of this invention is to be used as a solid topcoating paint, a combination of an acrylic resin of the kind described hereinabove with a suitable resin such as an oil-modified polyester resin may be employed as component (B).

In the case of forming a topcoated film consisting of a base coated film and a clear coated film (in the case of (d) above), the coating composition of the present invention may be used for forming either coated film (base coated film or clear coated film) or may be used for forming both (base coated film and clear coated film).

When the coating composition of the present invention is to be used as a topcoating paint, an acrylic resin is preferred as component (B). In particular, use of a fluororesin-modified, hydroxyl group-containing acrylic resin or a cellulose ester-modified, hydroxyl group-containing acrylic resin is preferable. A preferred example of the fluororesin-modified, hydroxyl group-containing acrylic resin is the fluoroolefin-modified acrylic resin as described in JP-A-2-245067.

Examples of the cellulose ester-modified, hydroxyl group-containing acrylic resin include those obtained by modifying hydroxyl group-containing acrylic resins of the kind described hereinabove with cellulose nitrate, cellulose propionate, cellulose butyrate, cellulose acetate butyrate, cellulose acetate propionate, or mixtures thereof. The amount of such a cellulose ester is preferably about from 2 to 50% by weight, more preferably from 5 to 20% by weight, based on the solid amount of the hydroxyl group-containing acrylic resin.

When the coating composition of the present invention is to be used as the base coating paint of a topcoating paint, it is especially preferred to select a cellulose ester-modified, hydroxyl group-containing acrylic resin as component (B). The thickness of the base coated film in this case is preferably from 15 to 20 µm on a dry basis.

When the coating composition of the present invention is to be used as the clear coating paint of a topcoating paint, it is especially preferred to select a fluororesin-modified acrylic resin as component (B). The thickness of the clear coated film in this case is preferably from 30 to 50 µm on a dry basis.

The coating composition of the present invention can also be used as an intermediate coating paint as in the case of (e) above. In this case, it is preferred to select a hydroxyl group-containing polyester resin of the kind described hereinabove (including various modified polyester resins, i.e., epoxy-modified, oil-modified, melamine-modified, and urethane-modified polyester resins) as the resin of component (B) in the coating composition of this invention. The thickness of the intermediate coated film in this case is preferably from 30 to 50 µm on a dry basis.

(2) Application in Coating Process Comprising Electrodeposition Coating and Topcoating On the other hand, in the case of (f) above, electrodeposition coating is conducted as described above, and a coating paint obtained from the coating composition of the present invention is applied on the electrodeposited coated film. In this case, it is preferred to use a polyester resin as component (B) in the coating composition of this invention. Especially preferred as component (B) is a lactone-modified polyester resin. The thickness of the coated film is preferably from 5 to 40 µm on a dry basis.

Thereafter, topcoating is conducted on the coated film formed from the coating composition of the present invention, in the same manner as in (a) above.

In the case of (g) above, electrodeposition coating is conducted in the same manner as described above, and a solid topcoating paint obtained from the impact-resistant composition of the present invention is then applied in the same manner as in (c) above.

In the case of (h) above, a base coated film and a clear coated film are formed as a topcoating paint on an electrodeposited coated film in the same manner as in (d) above.

EXAMPLE

The present invention will be explained below in more detail with reference to the following examples, but the invention is not construed as being limited thereto.

EXAMPLES 1 TO 3 AND COMPARATIVE EXAMPLES 1 TO 4

A cationic electrodeposition coating paint (Power Top U-226E, manufactured by Nippon Paint Co., Ltd.) was applied by electrodeposition-coating on a dull steel sheet which had dimensions of 7 cm×15 cm×0.8 mm and had undergone zinc phosphate treatment, at a thickness of about 20 μm on a dry basis. The coated film was then baked under conditions of 165° C. and 30 minutes.

Subsequently, a biuret-type blocked HDI to which polycaprolactone-modified diol had been bonded ("SBU-0869", manufactured by Sumitomo Bayer Urethane Co., Ltd., Japan; number-average molecular weight: about 1,500) as component (A) was mixed with an acrylic resin (B1) (a hydroxyl group-containing acrylic resin having a $T_g$ of −34° C. and a number-average molecular weight of about 5,000; nonvolatile content: 64%; hydroxyl value: 160; acid value: 2.4) as component (B) in such a proportion that the ratio of the solid amount of (A) to that of (B) was 60:40 by weight. This mixture was further mixed with other ingredients according to the formulation given below to prepare an impact-resistant composition. In this composition, the molar ratio of isocyanate groups (NCO) in component (A) to hydroxyl groups (OH) in component (B) was 1:1.

| Formulation for Impact-Resistant Composition | |
| --- | --- |
| Components (A) and (B) | 100 parts by weight in total (solid amount) |
| Titanium dioxide | 5 parts by weight |
| Carbon black | 0.5 part by weight |
| Liponox NC-60 | 1 part by weight (surface modifier) |
| Dibutyltin dilaurate | 1.5 parts by weight |
| Solvent[(1)] | 210 parts by weight |

Note
[(1)]: Solvent consisting of a 1/1 (by weight) mixture of butyl acetate and xylene.

As a thinner solvent for dilution, a 1:1 (by weight) mixture of butyl acetate and toluene was employed. The impact-resistant composition obtained above was dissolved in this solvent so that the viscosity of the resulting paint as measured with a #4 Ford cup was adjusted at 11 seconds. This coating paint was applied by air spray at a thickness of about 10 μm on a dry basis.

After the coating paint applied was allowed to set for about 2 minutes, an intermediate coating paint ("Orga P-61-1 Gray", manufactured by Nippon Paint Co., Ltd.; polyester/melamine resin coating paint) was applied by air spray coating at a thickness of about 35 μm on a dry basis (by the wet-on-wet method), and was baked at 140° C. for 25 minutes.

Thereafter, an acrylic resin-type base topcoating paint ("Superlac M-80 Metallic Base", manufactured by Nippon Paint Co., Ltd.) was applied at a thickness of about 15 μm on a dry basis, and the resulting coating was allowed to set for 3 minutes. A clear coating paint ("Superlac O-130 Clear", manufactured by Nippon Paint Co., Ltd.) was then applied at a thickness of about 30 μm on a dry basis, and the resulting coating was allowed to set for about 10 minutes. Baking was then conducted at 140° C. for 25 minutes to obtain a test piece (Example 1).

Test pieces were prepared in the same manner as in Example 1 except that as component (A) in the impact-resistant composition, use was made of an isocyanurate-type blocked HDI to which polycaprolactone-modified diol had been bonded ("SBU-0890", manufactured by Sumitomo Bayer Urethane Co., Ltd.) (Example 2) or a trimethylolpropane adduct-type blocked isocyanate to which polycaprolactone-modified diol had been bonded ("NN-5", manufactured by Nippon Polyurethane Co., Ltd., Japan) (Example 3) in place of the polycaprolactonediol-bonded, biuret-type blocked HDI. In the impact-resistant compositions used in Examples 2 and 3, the molar ratio of NCO/OH was 1/1.

Further, test pieces were prepared in the same manner as in Example 1 except that an isocyanurate-type blocked HDI to which polycaprolactonediol had not been bonded was used as component (A) in the impact-resistant composition (Comparative Example 1); except that a polyisocyanate compound was not used and the same acrylic resin as used in Example 1 was used along with a melamine resin as a hardener therefor (Comparative Example 2); except that in place of the impact-resistant composition according to the present invention, a conventional solvent-based chipping primer was applied at a thickness of 5 μm on a dry basis (Comparative Example 3); or except that neither the impact-resistant composition according to the present invention nor a chipping primer was used and the test piece was obtained only through electrodeposition coating, intermediate coating, and topcoating (Comparative Example 4).

The test pieces obtained were evaluated with respect to chipping resistance and coated film appearance by the methods described below. Further, each impact-resistant composition was evaluated with respect to washability by the method given below. The results obtained are summarized in Table 1.

(1) Chipping Resistance

Test was conducted using a Graverro tester (manufactured by Suga Shikenki K. K., Japan) under the following conditions.

| Stone size | #7 crushed stone (according to JIS-A-5001) |
| --- | --- |
| Stone amount | 50 g |
| Distance | 35 cm |
| Air pressure | 4.0 kg/cm$^2$ |
| Angle | 45° |
| Test temperature | −20° C. |

After the chipping resistance test, the resulting samples were visually examined and the degrees of chipping resistance were evaluated in the following five grades, with the chipping resistance of the test sample having no chipping primer layer (Comparative Example 4) being taken as "B".

E: Excellent (no peelings were entirely observed)

G: Good (few peelings were observed)

M: Standard (peelings of 1 mmφ or smaller were scatteringly observed)

P: Poor (peelings were considerably observed)

B: Bad (peelings were extremely considerably observed)

(2) Coated film Appearance

The test pieces that had undergone up to topcoating were visually evaluated for surface shrinkage, blurring, and the ash blushing property in the following five grades.

E: Excellent (shrinkage, blurring, and ash blushing were not entirely observed)

G: Good (shrinkage, blurring, and ash blushing were not almost observed)

M: Standard (shrinkage, blurring, and ash blushing were slightly observed)

P: Poor (shrinkage, blurring, and ash blushing were considerably observed)

B: Bad (shrinkage, blurring, and ash blushing were extremely considerably observed)

(3) Washability

Each of the chipping-resistant coating compositions (and the conventional chipping primer) used in the Examples and Comparative Examples was applied alone on a tinplate and allowed to stand at 20° C. for 5 minutes. The coated tinplate was then immersed in a xylene/butyl acetate (8/2 by weight) mixed solvent for 5 minutes and taken out, and each coated film was then scrubbed lightly with a brush. The dissolved states of the resulting coated films were visually examined and evaluated.

EXAMPLES 9 TO 15

For the purpose of examining the effect of changes in the molecular weight of component (B) (hydroxyl group-containing acrylic resin) with respect to coated film appearance and chipping resistance, hydroxyl group-containing acrylic resins having different average molecular weights were used to prepare impact-resistant compositions, and test pieces were prepared using the compositions in the same manner as in Example 1. In each impact-resistant (coating) composition, the molar ratio of —OH/—NCO was 1/1.

These test pieces were evaluated with respect to coated film appearance and chipping resistance in the same manner

TABLE 1

| Example No. | Hardener component | Resin component | Coated film appearance | Chipping resistance | Washability |
| --- | --- | --- | --- | --- | --- |
| Ex. 1 | SBU-0869[1] | B1[2] | E | G | G |
| Ex. 2 | SBU-0890[3] | B1[2] | G | M | G |
| Ex. 3 | NN-5[4] | B1[2] | G | M | G |
| Comp. Ex. 1 | BL-3175[5] | B1[2] | G | P | G |
| Comp. Ex. 2 | UVAN[6] | B1[2] | G | P | G |
| Comp. Ex. 3 | none | CP[7] | E | G | B |
| Comp. Ex. 4 | no chipping primer | | E | B | — |

Notes to Table 1
G: The coated film was entirely dissolved away, leaving no coated film.
B: The coated film remained almost undissolved.
[1]: Polycaprolactone-modified diol-bonded, biuret-type blocked HDI (SBU-0869, manufactured by Sumitomo Bayer Urethane Co., Ltd.; number-average molecular weight: about 1,500).
[2]: Acrylic resin (B1); Hydroxy group-containing acrylic resin obtained from the monomers of St/LMA/4HBA/MAA = 13/46/41/0.3 (by weight) and having a $T_g$ of −34° C. and a hydroxyl value of 160; number-average molecular weight: about 5,000; nonvolatile content: 64%; solvent, butyl acetate/xylene = 20/80 (by weight).
[3]: Polycaprolactone-modified diol-bonded, isocyanurate-type blocked HDI (manufactured by Sumitomo Bayer Urethane Co., Ltd.).
[4]: Polycaprolactone-modified diol-bonded, TMP (tri-methylolpropane) adduct-type blocked isocyanate (manufactured by Nippon Polyurethane Co., Ltd.).
[5]: Polycaprolactone-modified diol-unmodified, isocyanurate-type blocked HDI (manufactured by Sumitomo Bayer Urethane Co., Ltd.; number-average molecular weight, about 700).
[6]: Melamine resin "UVAN-20N-60", manufactured by Mitsui Toatsu Chemicals, Inc., Japan.
[7]: Solvent-based, modified polyolefin-type chipping primer.

EXAMPLES 4 TO 8 AND COMPARATIVE EXAMPLES 5 AND 6

Using the same steel sheets as used in Example 1 and using the above-described SBU-0869 as component (A) and the above-described acrylic resin (B1) as component (B), the coating was conducted in the same manner as in Example 1 except that the proportion of component (A) to component (B) (indicated by the molar ratio of —OH/—NCO) was varied as shown in Table 2. Thus, test pieces were obtained.

Each test piece was evaluated with respect to coated film appearance and chipping resistance in the same manner as in Example 1. The results obtained are shown in Table 2.

TABLE 2

| Example No. | —OH/—NCO | Coated film appearance | Chipping resistance |
| --- | --- | --- | --- |
| Ex. 4 | 75/25 | M | M |
| Ex. 5 | 60/40 | G | G |
| Ex. 6 | 50/50 | E | G |
| Ex. 7 | 40/60 | E | G |
| Ex. 8 | 25/75 | E | M |
| Comp. Ex. 5 | 100/0[1] | B | P |
| Comp. Ex. 6 | 0/100[2] | E | P |

Notes to Table 2
[1]: Component (A) (polyisocyanate compound) was omitted.
[2]: Component (B) (acrylic resin (B1)) was omitted.

as in Example 1. The number-average molecular weights and glass transition temperatures of the hydroxyl group-containing acrylic resins used above and the evaluation results obtained are shown in Table 3. (The polyisocyanate compound used was "SBU-0869", manufactured by Sumitomo Bayer Urethane Co., Ltd.)

TABLE 3

| Example No. | Number-average molecular weight | $T_g^{(1)}$ (°C.) | Coated film appearance | Chipping resistance |
| --- | --- | --- | --- | --- |
| Ex. 9 | 5000[2] | −34 | E | G |
| Ex. 10 | 7000[3] | −34 | E | M |
| Ex. 11 | 4200[4] | −34 | E | G |
| Ex. 12 | 3700[5] | −34 | G | E |
| Ex. 13 | 3500[6] | −34 | G | E |
| Ex. 14 | 3100[7] | −34 | G | E |
| Ex. 15 | 2600[8] | −34 | M | E |

Notes to Table 3
[1]: Glass transition temperatures of the hydroxyl group-containing acrylic resins used.
[2]: Acrylic resin (B1).
[3] to [8]: Acrylic resins made to have varying molecular weights by changing the synthesis conditions (temperature and catalyst amount) for acrylic resin (B1).

EXAMPLES 16 TO 19

For the purpose of examining the effect of differences in the glass transition temperature ($T_g$: ° C.) of a hydroxyl group-containing acrylic resin with respect to coated film appearance and chipping resistance, hydroxyl group-containing acrylic resins having different glass transition temperatures were used to prepare impact-resistant compositions, and test pieces were prepared using the compositions in the same manner as in Example 1. In each impact-resistant composition, the molar ratio of —OH/1'NCO was 1/1.

These test pieces were evaluated with respect to coated film appearance and chipping resistance in the same manner as in Example 1. The glass transition temperatures of the hydroxyl group-containing acrylic resins used above and the evaluation results obtained are shown in Table 4. (The polyisocyanate compound used was "SBU-0869", manufactured by Sumitomo Bayer Urethane Co., Ltd.)

TABLE 4

| Example No. | $T_g$ (°C.)[1] | Coated film appearance | Chipping resistance |
| --- | --- | --- | --- |
| Ex. 16 | −5[3] | E | M |
| Ex. 17 | −20[4] | E | G |
| Ex. 18 | −34[2] | E | G |
| Ex. 19 | −45[5] | G | M |

Notes to Table 4
[1]: Glass transition temperatures of the hydroxyl group-containing acrylic resins used.
[2]: Acrylic resin (B1).
[3] to [5]: Acrylic resins made to have varying $T_g$'s by changing the proportion of St:LMA.

EXAMPLES 20 TO 23

Dull steel sheets were subjected to electrodeposition coating, coating with a chipping-resistant coating paint, intermediate coating, and topcoating in the same manner as in Example 1 except that each of impact-resistant compositions containing either of the hydroxyl group-containing acrylic resins shown in Table 5 as component (B) and containing the above-described SBU-0869 as component (A) (the molar ratio of —OH/—NCO being 1/1) was used (Examples 20 and 21).

Further, test pieces were prepared in the same manner as in Example 21 except that use was made of a coating paint obtained by further adding crosslinked-polymer fine particles ("AZS 797", manufactured by Nippon Paint Co., Ltd.) to the same chipping-resistant coating paint as used in Example 21, in an amount of 5 parts by weight or 10 parts by weight per 100 parts by weight of the solid resin components.

Each of the test pieces obtained was evaluated with respect to coated film appearance and chipping resistance in the same manner as in Example 1. The results obtained are shown in Table 5.

TABLE 5

| Example No. | Acrylic resin | Fine resin particle[1] | Coated film appearance | Chipping resistance |
| --- | --- | --- | --- | --- |
| Ex. 20 | B2[2] | 0 | G–M | E |
| Ex. 21 | B3[3] | 0 | G | E |
| Ex. 22 | B3[3] | 5 parts by weight | E–G | E |
| Ex. 23 | B3[3] | 10 parts by weight | E | E |

Notes to Table 5
[1]: Amount of crosslinked-polymer fine particles ("AZS 797", manufactured by Nippon Paint Co., Ltd.) per 100 parts by weight of solid resin components.
[2]: B2 is the same as the acrylic resin used in Example 13 except that the solvent has been replaced by butyl acetate/xylene (10/90 by weight).
[3]: B3 is the same as the acrylic resin used in Example 13 except that the solvent has been replaced by ethyl acetate/toluene (20/80 by weight).

EXAMPLE 24 AND COMPARATIVE EXAMPLES 7 TO 9

Test pieces were prepared in the same manner as in Example 20 except that each of the compounds (hardeners) shown in Table 6 was used as component (A). The test pieces obtained were evaluated with respect to coated film appearance and chipping resistance in the same manner as in Example 20. The hardeners (polyisocyanate compounds or other compound) used, the types of the blocked isocyanates (BI), and the evaluation results obtained are shown in Table 6. For reference, the type of the polyisocyanate compound used in Example 20 and the evaluation results for the example are also shown in Table 6.

TABLE 6

| Example No. | Hardener | Type of BI | NCO/OH | Coated film appearance | Chipping resistance |
| --- | --- | --- | --- | --- | --- |
| Ex. 20 | SBU-0869[1] | biuret | 50/50 | G–M | E |
| Ex. 24 | SBU-0890[2] | isocyanurate type | 50/50 | G | G |
| Comp. Ex. 7 | BL-3175[3] | isocyanusate type | 50/50 | E | P |
| Comp. Ex. 8[4] | UVAN[5] | — | 70/30[6] | E | P |
| Comp. Ex. 9 | S-HT[7] | TMP adduct-type | 50/50 | G | P |

Notes to Table 6
[1]: Polycaprolactonediol-bonded, biuret-type blocked HDI, manufactured by Sumitomo Bayer Urethane Co., Ltd.
[2]: Polycaprolactone-modified diol-bonded, isocyanurate-type blocked HMDI, manufactured by Sumitomo Bayer Urethane Co., Ltd.
[3]: Polycaprolactone-modified diol-unbonded, isocyancuate-type blocked HDI, manufactured by Sumitomo Bayer Urethane Co., Ltd.
[4]: The coating paint contains no polyisocyanate compound, and comprises an acrylic resin and a melamine resin with which the acrylic resin is cured.
[5]: Melamin resin "UVAN 20N-60", manufactured by Mitsui Toatsu Chemicals, Inc.
[6]: The ratio 70/30 indicates the weight ratio of acrylic resin/melamine resin.
[7]: Sumidur HT (manufactured by Sumitomo Bayer Urethane Co., Ltd.).

EXAMPLES 25 AND 26 AND COMPARATIVE EXAMPLES 10 TO 15

Test pieces were prepared in the same manner as in Example 1 except that each of the following two coating paint sets was used as a topcoating paint; each topcoating paint set composed of two coating paints consisting of a base coating paint (for forming the lower coated film) and a clear coating paint (for forming the upper coated film). Topcoating paint (i): Water-soluble or water-dispersible (i.e., water based) coating paint of the acrylic/melamine resin type (1) "Orga TO-H900 Metallic Base" (water-based), manufactured by Nippon Paint Co., Ltd.

(2) "Orga TO-561 Clear" (solvent-based), manufactured by Nippon Paint Co., Ltd.

Topcoating paint (ii): Coating paint formulated for protection against acid rain (1) "Orga TO-H500 Metallic Base" (solvent-based), manufactured by Nippon Paint Co., Ltd.

(2) "Orga TO-H580 Clear" (solvent-based), manufactured by Nippon Paint Co., Ltd.

The test pieces obtained were evaluated with respect to coated film appearance and chipping resistance in the same manner as in Example 1. The results obtained are shown in Table 7.

For purposes of comparison, test pieces (Comparative Examples 10 to 12) were prepared in the same manner as in Example 1 except that a maleic acid-modified polyolefin-type chipping primer was used in place of the impact-resistant composition according to the present invention, and that the same topcoating paint as used in Example 1 (topcoating paint (iii) shown below), the above-described topcoating paint (i), or the above-described topcoating paint (ii) was used as a topcoating paint. The maleic acid-modified polyolefin-type chipping primer was applied at a thickness of 5 μm on a dry basis.

Topcoating paint (iii): Acrylic/melamine resin coating paint (solvent-based)

(1) "Superlac M-80 Metallic Base", manufactured by Nippon Paint Co., Ltd.

(2) "Superlac O-130 Clear", manufactured by Nippon Paint Co., Ltd.

Further, test pieces (Comparative Examples 13 to 15) were prepared through electrodeposition coating, intermediate coating, and topcoating (coating with one of topcoating paints (i) to (iii)), without using the impact-resistant composition or any conventional chipping primer.

The test pieces obtained were evaluated for coated film appearance and chipping resistance in the same manner as in Example 1. The results obtained are shown in Table 7.

TABLE 7

| Example No. | Primer | Topcoating paint[1] | Coated film appearance | Chipping resistance |
| --- | --- | --- | --- | --- |
| Ex. 25 | primer of the invention[2] | (i) | E | E |
| Ex. 26 | primer of the invention[2] | (ii) | E | E |
| Comp. Ex. 10 | M-PO[3] | (iii) | E | G |
| Comp. Ex. 11 | M-PO[3] | (i) | E | G |
| Comp. Ex. 12 | M-PO[3] | (ii) | E | M |
| Comp. Ex. 13 | none | (iii) | E | P |
| Comp. Ex. 14 | none | (i) | E | P |
| Comp. Ex. 15 | none | (ii) | E | P |

Notes to Table 7
[1]: Topcoating paints (i) to (iii) each consists of a combination of a base coating paint and a clear coating paint as described above.
[2]: The primer is the same as the impact resistant coating composition used in Example 1.
[3]: Maleic acid-modified polyolefin-type chipping primer.

EXAMPLES 27 TO 29

The same dull steel sheets as used in Example 1 were subjected to electrodeposition coating and baking and then to intermediate coating and baking in the same manner as in Example 1. On the intermediate coated film, a chipping-resistant coated film was then formed at a thickness of 10 μm on a dry basis from the same impact-resistant composition as used in Example 1. After the resulting coating was allowed to set for 2 minutes, topcoating was conducted using each of the above-described topcoating paints (i) to (iii) (each consisting of a combination of a base coating paint and a clear coating paint), followed by baking at 140° C. for 25 minutes. The test pieces obtained were evaluated with respect to coated film appearance and chipping resistance in the same manner as in Example 1. The results obtained are shown in Table 8.

TABLE 8

| Example No. | Topcoating paint | Coated film appearance | Chipping resistance |
| --- | --- | --- | --- |
| Ex. 27 | (i) | E | E |
| Ex. 28 | (ii) | E | E |
| Ex. 29 | (iii) | E | E |

EXAMPLE 30

The same dull steel sheet as used in Example 1 was subjected to electrodeposition coating and baking in the same manner as in Example 1. Thereafter, a chipping-resistant coated film was formed at a thickness of 10 μm on a dry basis using the same impact-resistant coating composition as that used in Example 1. After the resulting coating was allowed to set for 2 minutes, a solid-type polyester resin topcoating paint ("Orga G-75 White", manufactured by Nippon Paint Co., Ltd.) was applied thereon, to obtain a test piece. This test piece was evaluated with respect to coated film appearance and chipping resistance in the same manner as in Example 1. As a result, the coated film appearance was evaluated as "E" and the chipping resistance as "G".

EXAMPLES 31 TO 40 AND COMPARATIVE EXAMPLE 16

The same dull steel sheets as used in Example 1 were subjected to electrodeposition coating in the same manner as in Example 1.

A polycaprolactone-modified diol-bonded, biuret-type blocked HDI ("SBU-0869", manufactured by Sumitomo Bayer Urethane Co., Ltd.; number-average molecular weight: about 1,500) as component (A) was mixed with each of the component (B) resins shown in Table 9. The resulting mixtures each was further mixed with the same ingredients as those used for preparing the impact-resistant composition of Example 1, thereby to obtain chipping-resistant (i.e., impact-resistant) coating compositions. In each of these compositions, the molar ratio of isocyanate groups (—NCO) in component (A) to hydroxyl groups (—OH) in component (B) was 1:1.

In Example 40, in which Jeffamine D2000 (a polyoxyalkylamine manufactured by Texaco Chemical Co.) was used as the resin of component (B), the proportion of component (A) to component (B) was such that the molar ratio of isocyanate groups (—NCO) in component (A) to active hydrogen (—H) in component (B) was 1:1.

The viscosity of each of the thus-obtained chipping-resistant coating compositions was adjusted in the same manner as in Example 1, and the coating compositions each was then applied on the electrodeposited coated film in the same manner as in Example 1 at a thickness of about 5 μm on a dry basis.

After the resulting coatings were allowed to set for about 2 minutes, an intermediate coating paint ("Orga P-61-1 Gray", manufactured by Nippon Paint Co., Ltd.; polyester/melamine resin coating paint) was applied by air spray coating at a thickness of about 35 μm on a dry basis (by the wet-on-wet method), and was baked at 140° C. for 25 minutes.

Thereafter, the above-described topcoating paint (i), (ii), or (iii) was applied and baked in the same manner as in Example 1. Thus, test pieces having a topcoated film formed from topcoating paint (i), (ii), or (iii) were obtained. In these examples, the sequence of coating was: electrodeposition coating/CP coating/intermediate coating/topcoating, where CP is the impact-resistant composition coating according to the present invention.

The test pieces obtained were evaluated for chipping resistance in the same manner as in Example 1. The results obtained are shown in Table 9.

Further, a test piece having a topcoated film formed from topcoating paint (iii) was prepared in the same manner as in Example 31 except that the impact-resistant composition according to the present invention was not used (Comparative Example 16). This test piece also was evaluated in the same manner as in Example 31 with respect to chipping resistance. The result obtained is shown in Table 9.

TABLE 9

| Example No. | Component (B) | Chipping resistance paint (i) | paint (ii) | paint (iii) |
| --- | --- | --- | --- | --- |
| Ex. 31 | polyester resin[1] | E | E | E |
| Ex. 32 | lactone-modified polyester resin[2] | E | E | E |
| Ex. 33 | coconut oil-modified polyester resin[3] | E | E | E |
| Ex. 34 | melamine-modified polyester resin[4] | E | E | E |
| Ex. 35 | lactone-modified acrylic resin A[5] | E | E | E |
| Ex. 36 | lactone-modified acrylic resin B[6] | E | E | E |
| Ex. 37 | 2-ethyl-1,3-hexanediol[7] | E | E | E |
| Ex. 38 | 1,5-pentanediol[8] | E | E | E |
| Ex. 39 | polycaprolactonediol[9] | E | E | E |
| Ex. 40 | polyoxyalkyleneamine[10] | E | E | E |
| Comp Ex. 16 | no chipping primer | — | — | B |

Notes to Table 9
[1]: Espel 1690, manufactured by Hitachi Chemical Co., Ltd., Japan; nonvolatile content: 64.8%; hydroxyl value: 120; number-average molecular weight: 2,700.
[2]: Lactone-modified polyester resin in which a lactone backbone has been incorporated in both the main chain and side chains. CDE-9P, manufactured by Daicel Chemical Industries, Ltd., Japan; nonvolatile content: 80%; hydroxyl value: 90; number-average molecular weight: 3,500.
[3]: BS 57-851-65, manufactured by Dainippon Ink & Chemicals, Inc., Japan; nonvolatile content: 65%; hydroxyl value: 100; number-average molecular weight: 2,109.
[4]: BL BF-115-65X, manufactured by Dainippon Ink & Chemicals, Inc.; nonvolatile content: 65%; hydroxyl value: 130; number-average molecular weight: 2,900.
[5]: EPA-5860, manufactured by Daicel Chemical Industries, Ltd.; nonvolatile content: 60%; hydroxyl value: 30; number-average molecular weight: 5,000.
[6]: DC-2209, manufactured by Daicel Chemical Industries, Ltd.; nonvolatile content: 50%; hydroxyl value: 50.0 (solid amount); number-average molecular weight: 11,000.
[7]: EHD, manufactured by Chisso Petrochemical Corp., Japan; nonvolatile content: 100%; hydroxyl equivalent: 73; number-average molecular weight: 146.

TABLE 9-continued

| Example No. | Component (B) | Chipping resistance paint (i) | paint (ii) | paint (iii) |
| --- | --- | --- | --- | --- |

[8]: Nonvolatile content: 100%; hydroxyl equivalent: 52; number-average molecular weight: 104; manufactured by Wako Pure Chemical Industries, Ltd., Japan.
[9]: Proxel 205, manufactured by Daicel Chemical Industries, Ltd.; nonvolatile content: 100%; hydroxyl value: 212; number-average molecular weight: 530.
[10]: Jeffamine D2000, manufactured by Texaco Chemical Co.; nonvolatile content: 100%; hydroxyl equivalent: 520; number-average molecular weight: 2,000.

EXAMPLE 41

Ten kinds of test pieces were prepared in the same manner as in Examples 31 to 40 except that each of the impact-resistant compositions (CP) according to the present invention was not used to form a coated film disposed between the electrodeposited coated film and the intermediate coated film, but applied on the intermediate coated film. As the topcoating paint, the above-described topcoating paint (iii) was selected.

The sequence of coating in this example was: electrodeposition coating/intermediate coating/CP coating/topcoating.

The test pieces obtained were evaluated with respect to chipping resistance in the same manner as in Example 1. As a result, the chipping resistance was evaluated as "E" for all the test pieces.

EXAMPLE 42

Test pieces were prepared in the same manner as in Examples 31 to 40 except that a polycaprolactone-modified diol-bonded, isocyanurate-type blocked HDI ("SBU-0890", manufactured by Sumitomo Bayer Urethane Co., Ltd.) was used as component (A) in the impact-resistant compositions (CP) in place of the polycaprolactonediol-bonded, biuret-type blocked HDI. In this example, coated films were formed according to the following sequence of coating: electrodeposition coating/CP coating/intermediate coating/topcoating.

As the topcoating paint, the above-described topcoating paint (iii) was used.

Each of the test pieces was evaluated for chipping resistance in the same manner as in Example 1. As a result, the evaluation was "G" for all the test pieces.

EXAMPLE 43

A dull steel sheet was subjected to electrodeposition coating in the same manner as in Example 1.

A polycaprolactonediol-bonded, biuret-type blocked HDI ("SBU-0869", manufactured by Sumitomo Bayer Urethane Co., Ltd.; number-average molecular weight: about 1,500) as component (A) was mixed with a polyester resin ("Espel 1690", manufactured by Hitachi Chemical Co., Ltd.; nonvolatile content: 64.8%; hydroxyl value: 120; number-average molecular weight: 2,700) as component (B) and further with other ingredients according to the formulation given below, thereby to obtain an impact (i.e., chipping)resistant coating composition for intermediate coating (intermediate coat CP coating). In this intermediate coat CP coating, the molar ratio of isocyanate groups (—NCO) in component (A) to hydroxyl groups (—OH) in component (B) was 1:1.

| Formulation for Intermediate Coat CP Coating Paint | |
| --- | --- |
| Components (A) and (B) | 100 parts by weight in total (solid amount) |
| Titanium dioxide | 55 parts by weight |
| Carbon black | 2 parts by weight |
| Anti-settling agent | 2 parts by weight |
| Surface modifier | 1 part by weight |
| Dibutyltin dilaurate | 65 parts by weight |
| Solvent | 65 parts by weight |

Composition of the solvent

Solvesso 150 (manufactured by Exxon Chemical Co.)/xylene/butyl acetate=1/2/1 (by weight)

The thus-obtained intermediate coating composition was diluted with a 1/1 (by weight) mixture of Solvesso 150 and butyl acetate as a thinner. This coating paint was applied on the electrodeposited coated film by air spray coating at a thickness of 35 μm on a dry basis, and baked at 140° C. for 25 minutes. Thereafter, using the above-described topcoating paint (iii), a topcoated film was formed in the same manner as in Example 1.

The sequence of coating in this example was: electrodeposition coating/intermediate coat CP coating/topcoating.

The test piece obtained was evaluated with respect to chipping resistance in the same manner as in Example 1. As a result, the evaluation was "E".

EXAMPLE 44

A test piece was prepared in the same manner as in Example 43 except that a polycaprolactone-modified diol-bonded, isocyanurate-type blocked HDI (SBU-0890, manufactured by Sumitomo Bayer Urethane Co., Ltd.) was used as component (A) in the impact (i.g., chipping)-resistant intermediate coating composition in place of the polycaprolactone-modified diol-bonded, biuret-type blocked HDI. The test piece obtained was evaluated for chipping resistance in the same manner as in Example 1. As a result, the evaluation was "G".

EXAMPLE 45

A test piece was prepared in the same manner as in Example 43 except that a chipping-resistant coating (CP) paint consisting of (A) a polycaprolactone-modified diol-bonded, biuret-type blocked HDI ("SBU-0869", manufactured by Sumitomo Bayer Urethane Co., Ltd.; number-average molecular weight: about 1,500) and (B) a lactone-modified polyester resin in which a lactone backbone had been incorporated in both the main chain and side chains ("CDE- 9P", manufactured by Daicel Chemical Industries, Ltd.; nonvolatile content: 80%; hydroxyl value: 90; number-average molecular weight: 3,500) was applied prior to the application of the chipping-resistant intermediate coating paint, i.e., intermediate coat CP paint, (that is, on the electrodeposited coated film) at a thickness of 5 μm on a dry basis. In the CP, the molar ratio of —NCO/—OH was 1:1.

The sequence of coating in this example was: electrodeposition coating/CP coating/intermediate coat CP coating/topcoating.

The test piece obtained was evaluated with respect to chipping resistance in the same manner as in Example 1. As a result, the evaluation was "E".

EXAMPLE 46

A test piece was prepared in the same manner as in Example 45 except that the order of the application of the chipping-resistant coating (CP) paint consisting of (A) a polycaprolactone-modified diol-bonded, biuret-type blocked HDI and (B) a lactone-modified polyester resin and the chipping-resistant intermediate coating paint (intermediate coat CP paint) was reversed.

The sequence of coating in this example was: electrodeposition coating/intermediate coat CP coating/CP coating/topcoating.

The test piece obtained was evaluated for chipping resistance in the same manner as in Example 1. As a result, the evaluation was "E".

EXAMPLE 47

A test piece was prepared in the same manner as in Example 45 except that a polycaprolactone-modified diol-bonded, isocyanurate-type blocked HDI ("SBU-0890", manufactured by Sumitomo Bayer Urethane Co., Ltd.) was used as component (A) in the impact-resistant composition (CP) to be applied on an electrodeposited coated film. The test piece obtained was evaluated with respect to chipping resistance in the same manner as in Example 1. As a result, the evaluation was "G".

EXAMPLE 48

A dull steel sheet was subjected to electrodeposition coating in the same manner as in Example 1, and the same intermediate coating as used in Example 1 was then applied thereon to form an intermediate coated film.

A polycaprolactone-modified diol-bonded, biuret-type blocked HDI ("SBU-0869", manufactured by Sumitomo Bayer Urethane Co., Ltd.; number-average molecular weight: about 1,500) as component (A) was mixed with a cellulose acetate butyrate-modified acrylic resin (a modified acrylic resin obtained by reacting 100 parts by weight of cellulose acetate butyrate with 100 parts by weight of a copolymer of styrene, methyl methacrylate, ethyl methacrylate, ethyl acrylate, 2-hexylethyl methacrylate, and methyl acrylate; nonvolatile content: 40.5%; hydroxyl value: 45; number-average molecular weight: 11,100) as component (B) and further with other ingredients according to the formulation given below, thereby to obtain a chipping-resistant base topcoating composition (referred to as base topcoat CP coating). In this base topcoat CP coating, the molar ratio of isocyanate groups (—NCO) in component (A) to hydroxyl groups (—OH) in component (B) was 1:1.

| Formulation for Base Topcoat CP Coating Paint | |
| --- | --- |
| Components (A) and (B) | 100 parts by weight in total (solid amount) |
| Titanium dioxide | 60 parts by weight |
| Carbon black | 1 part by weight |
| Anti-settling agent | 2 parts by weight |
| Surface modifier | 1 part by weight |
| Dibutyltin dilaurate | 1.5 parts by weight |
| Solvent | 160 parts by weight |

Composition of the solvent xylene/methyl isobutyl ketone/ethyl acetate=7/2/1 (by weight)

The thus-obtained base topcoat CP coating paint was diluted with a 1:1 (by weight) mixture of ethyl acetate and xylene as a thinner to give a base topcoating paint. Topcoating was conducted in the same manner as in Example 1 using this base topcoating paint and using Superlac O-130 Clear (manufactured by Nippon Paint Co., Ltd.) as a clear topcoating paint. The base topcoating was applied at a thickness of 15 μm on a dry basis. The sequence of coating in this example was: electrodeposition coating/intermediate coating/base topcoat CP coating/clear topcoat coating.

The test piece obtained was evaluated with respect to chipping resistance in the same manner as in Example 1. As a result, the evaluation was "G".

EXAMPLE 49

A test piece was prepared in the same manner as in Example 48 except that a polycaprolactone-modified diol-bonded, isocyanurate-type blocked HDI (SBU-0890, manufactured by Sumitomo Bayer Urethane Co., Ltd.) was used as component (A) in the base topcoating paint (base topcoat CP coating paint). The test piece obtained was evaluated with respect to chipping resistance in the same manner as in Example 1. As a result, the evaluation was "G".

EXAMPLE 50

Coating operations up to intermediate coating were conducted in the same manner as in Example 48.

A polycaprolactonediol-bonded, biuret-type blocked HDI ("SBU-0869", manufactured by Sumitomo Bayer Urethane Co., Ltd.; number-average molecular weight: about 1,500) as component (A) was mixed with Lumiflon LF 9201 (a fluorine-containing resin manufactured by Asahi Glass Co., Ltd., Japan; nonvolatile content: 65.5%; hydroxyl value of the varnish: 52.4; number-average molecular weight: about 7,000) as component (B) and further with other ingredients according to the formulation given below, thereby to prepare a chipping-resistant clear topcoating composition (referred to as clear topcoat CP coating paint). In this clear topcoat CP coating paint, the molar ratio of —NCO/—OH was 1:1.

| Formulation for Clear Topcoat CP Coating Paint | |
|---|---|
| Components (A) and (B) | 100 parts by weight in total (solid amount) |
| Surface modifier | 2 parts by weight |
| Ultraviolet absorber | 1 part by weight |
| Antioxidant | 1 part by weight |
| Dibutyltin dilaurate | 1.5 parts by weight |
| Solvent | 95 parts by weight |

Composition of the solvent

Solvesso 150/xylene=½ (by weight)

Topcoating was conducted in the same manner as in Example 48 using Superlac M-80 Metallic Base (manufactured by Nippon Paint Co., Ltd.) as a base topcoating paint and using the above-described clear topcoat CP coating paint as a clear topcoating paint. The clear topcoat CP coating paint was applied at a thickness of 35 μm on a dry basis.

The sequence of coating in this example was: electrodeposition coating/intermediate coating/base topcoat coating/clear topcoat CP coating.

The test piece obtained was evaluated with respect to chipping resistance in the same manner as in Example 1. As a result, the evaluation was "G".

EXAMPLE 51

A test piece was prepared in the same manner as in Example 50 except that a polycaprolactone-modified diol-bonded, isocyanurate-type blocked HDI ("SBU-0890", manufactured by Sumitomo Bayer Urethane Co., Ltd.) was used as component (A) in the clear topcoating paint. The test piece obtained was evaluated with respect to chipping resistance in the same manner as in Example 1. As a result, the evaluation was "G".

EXAMPLE 52

The same dull steel sheet as used in Example 1 was subjected to electrodeposition coating and baking in the same manner as in Example 1.

An intermediate coating paint ("Orga P-61-1, Gray", manufactured by Nippon Paint Co., Ltd.; polyester/melamine resin coating paint) was applied on the electrodeposited coated film by air spray coating at a thickness of about 35 μm on a dry basis, and baked at 140° C. for 25 minutes.

A polycaprolactonediol-bonded, biuret-type blocked HDI ("SBU-0869", manufactured by Sumitomo Bayer Urethane Co., Ltd.; number-average molecular weight: about 1,500) as component (A) was mixed with a coconut oil-modified polyester resin ("BS 57-1086N", manufactured by Dainippon Ink & Chemicals, Inc.; nonvolatile content: 65%; hydroxyl value: 130; number-average molecular weight: 3,179) as component (B) and further with other ingredients according to the formulation given below, thereby to prepare a chipping-resistant solid topcoating composition (referred to as topcoat CP coating paint). In this topcoat CP coating paint, the molar ratio —NCO/—OH was 1:1.

| Formulation for Topcoat CP Coating Paint | |
|---|---|
| Components (A) and (B) | 100 parts by weight in total (solid amount) |
| Titanium dioxide | 50 parts by weight |
| Carbon black | 1 part by weight |
| Anti-settling agent | 2 parts by weight |
| Surface modifier | 1 part by weight |
| Dibutyltin dilaurate | 1.5 parts by weight |
| Solvent | 80 parts by weight |

Composition of the solvent:

Solvesso 150/xylene/methyl isobutyl ketone=2/5/1 (by weight)

On the intermediate coated film formed above, the thus-obtained topcoat CP coating paint was applied at a thickness of 35 μm on a dry basis. The coating was then baked.

The sequence of coating in this example was: electrodeposition coating/intermediate coating/topcoat CP coating.

The test piece obtained was evaluated with respect to chipping resistance in the same manner as in Example 1. As a result, the evaluation was "G".

EXAMPLE 53

A test piece was prepared in the same manner as in Example 52 except that a polycaprolactonediol-bonded, isocyanurate-type blocked HDI ("SBU-0890", manufactured by Sumitomo Bayer Urethane Co., Ltd.) was used as component (A) in the solid topcoating paint (topcoat CP coating paint). The test piece obtained was evaluated with respect to chipping resistance in the same manner as in Example 1. As a result, the evaluation was "G".

EXAMPLE 54

The same dull steel sheet as used in Example 1 was subjected to electrodeposition coating and baking in the same manner as in Example 1.

On the electrodeposited coated film, the same chipping-resistant coating (CP) paint as used in Example 32 was applied at a thickness of 5 μm on a dry basis.

After the resulting coating was allowed to set for about 2 minutes, an intermediate coating paint ("Orga P-61-1 Gray", manufactured by Nippon Paint Co., Ltd.; polyester/melamine resin coating paint) was applied by air spray coating at a thickness of about 35 μm on a dry basis (by the wet-on-wet method), and was baked at 140° C. for 25 minutes.

On the intermediate coated film, the same chipping-resistant solid topcoating paint (topcoat CP coating paint) as that used in Example 52 was applied at a thickness of about 35 μm on a dry basis.

The sequence of coating in this example was: electrodeposition coating/CP coating/intermediate coating/topcoat CP coating.

The test piece obtained was evaluated with respect to chipping resistance in the same manner as in Example 1. As a result, the evaluation was "E".

EXAMPLE 55

A test piece was prepared in the same manner as in Example 54 except that the order of the application of the same chipping-resistant coating (CP) paint as used in Example 32 and the intermediate coating was reversed. The coated film obtained was evaluated with respect to chipping resistance in the same manner as in Example 1. As a result, the evaluation was "E".

EXAMPLE 56

A test piece was prepared in the same manner as in Example 54 except that a polycaprolactone-modified diol-bonded, isocyanurate-type blocked HDI ("SBU-0890", manufactured by Sumitomo Bayer Urethane Co., Ltd.) was used as component (A) in the solid topcoating paint (topcoat CP coating paint). The test piece obtained was evaluated with respect to chipping resistance in the same manner as in Example 1. As a result, the evaluation was "G".

COMPARATIVE EXAMPLE 17

A test piece was prepared in the same manner as in Example 54 except that the application of a chipping-resistant coating paint on the electrodeposited coated film was omitted and that Orga G65 Red (manufactured by Nippon Paint Co., Ltd.) was used as a solid topcoating paint. The test piece obtained was evaluated with respect to chipping resistance in the same manner as in Example 1. As a result, the evaluation was "P".

COMPARATIVE EXAMPLE 18

A test piece was prepared in the same manner as in Example 20 except that the compound (hardener) shown in Table 10 was used as component (A). The test piece obtained was evaluated with respect to coated film appearance and chipping resistance in the same manner as in Example 20. The hardener (polyisocyanate compound or other compound) used, the type of the blocked isocyanate (BI), and the evaluation results obtained are shown in Table 10. For reference, the type of the polyisocyanate compound used in Example 20 and the evaluation results for the example are also shown in Table 10.

TABLE 10

| Example No. | Hardener | Type of BI | NCO/OH | Coated film appearance | Chipping resistance |
| --- | --- | --- | --- | --- | --- |
| Ex. 20 | SBU-0869[(1)] | biuret type | 50/50 | G–M | E |
| Comp. Ex. 18 | XRX2303[(2)]/ BL3175[(3)] | isocyanurate type | 50/50 | E | P |

Notes to Table 10
[(1)]: Polycaprolactone-modified diol-bonded, biuret-type blocked HDI, manufactured by Sumitomo Bayer Urethane Co., Ltd.
[(2)]: Urethane-modified polyester resin, manufactured by PPG Industries (hydroxyl value: 50; number-average molecular weight: 3,600).
[(3)]: Polycaprolactonediol-unbonded, isocyanurate-type blocked HDI, manufactured by Sumitomo Bayer Urethane Co., Ltd.

As described above in detail, since the coating composition of the present invention contains a polycaprolactonediol-modified blocked polyisocyanate preferably having a biuret structure, the coated film obtained therefrom has sufficient pliability and good chipping resistance. The coated film also has a good appearance. Therefore, the composition is suited for use in the coating of outside plates of automotive body.

Unlike conventional chipping primers, the coating composition of the present invention can be formulated to have a low solvent content, which makes it easy to observe the VOC regulations. The composition has another advantage that coating operations and the maintenance of the coating line are easy.

Further, it is possible to attain a solvent amount reduction by combining the impact-resistant coating composition of the present invention with a water-based coating paint. Furthermore, when used in combination with a coating paint formulated for protection against acid rain, the composition of the present invention enables the formation of a coated film having good durability.

While the invention has been described in detail and with reference to specific embodiments thereof, it will be apparent to one skilled in the art that various changes and modifications can be made therein without departing from the spirit and scope thereof.

What is claimed is:

1. An impact-resistant composition dissolved or dispersed in an organic solvent or water, said composition consisting essentially of (A) a polyisocyanate in which the active isocyanate groups have been blocked obtained from a polycaprolactone-modified diol bonded to an isocyanate compound, wherein said isocyanate compound has a structure selected from biuret or isocyanurate structures; and (B) at least one hydroxyl group-containing compound containing two or more hydroxyl groups per one molecule, said hydroxyl group-containing compound being selected from the group consisting of
   (1) a hydroxyl group-containing acrylic resin,
   (2) a hydroxyl group-containing polyester resin,
   (3) a diol of an aliphatic hydrocarbon having 2 to 8 carbon atoms, and
   (4) a hydroxyl group-containing epoxy resin.

2. The composition as claimed in claim 1, wherein the polyisocyanate has a proportion of the isocyanate compound moiety to the polycaprolactone-modified diol moiety of from 1/1 to 1/4 by weight.

3. The composition as claimed in claim 1, wherein the hydroxyl group-containing compound is a hydroxyl group-containing acrylic resin or a hydroxyl group-containing polyester resin.

4. The composition as claimed in claim 3, wherein the hydroxyl group-containing acrylic resin has a hydroxyl value of from 50 to 200 and the hydroxyl group-containing polyester resin has a hydroxyl value of from 40 to 200.

5. The composition as claimed in claim 1, wherein the weight ratio of the polyisocyanate to the hydroxyl group-containing compound is (20–80)/(80–20).

6. The composition as claimed in claim 5, wherein the weight ratio of the polyisocyanate to the hydroxyl group-containing compound is (30–70)/(70–30).

7. The composition as claimed in claim 1, wherein the molar ratio of —NCO groups of component A to —OH groups of component B is from (40–60)/(60–40).

8. The composition as claimed in claim 1, wherein the hydroxy group-containing compound is a hydroxyl group-containing acrylic resin.

9. An impact-resistant composition dissolved or dispersed in an organic solvent or water, said composition consisting essentially of (A) a polyisocyanate having blocked isocyanate groups obtained from a polycaprolactone-modified diol bonded to an isocyanate compound, wherein said isocyanate compound has a structure selected from biuret or isocyanurate structures, and (B) a hydroxyl group-containing acrylic resin or a hydroxyl group-containing polyester resin, containing two or more hydroxyl groups per one molecule, wherein said hydroxyl group-containing acrylic resin or a hydroxyl group-containing polyester resin is a polycaprolactone-modified hydroxyl group-containing acrylic resin or a polycaprolactone-modified hydroxyl group-containing polyester resin.

10. The composition as claimed in claim 9, wherein the polyisocyanate has a proportion of the isocyanate compound moiety to the polycaprolactone-modified diol moiety of from 1/1 to 1/4 by weight.

11. The composition as claimed in claim 9, wherein the weight ratio of the polyisocyanate to the hydroxyl group-containing acrylic resin or hydroxyl group-containing polyester resin is (30–70)/(70–30).

12. An impact-resistant composition dissolved or dispersed in an organic solvent, said composition consisting essentially of (A) a polyisocyanate having blocked isocyanate groups obtained from a polycaprolactone-modified diol bonded to an isocyanate compound, wherein said isocyanate compound has a structure selected from biuret or isocyanurate structures, and (B) a polyol having 2–8 carbon atoms or a polycaprolactone diol.

13. The composition as claimed in claim 12, wherein the polyisocyanate has a proportion of the isocyanate compound moiety to the polycaprolactone-modified diol moiety of from 1/1 to 1/4 by weight.

14. The composition as claimed in claim 12, wherein the weight ratio of the polyisocyanate to the a polyol having 2–8 carbon atoms or a polycaprolactone diol is (30–70)/(70–30).

15. An impact-resistant composition dissolved or dispersed in an organic solvent or water, said composition consisting essentially of (A) a polyisocyanate having blocked active isocyanate groups obtained from a polycaprolactone-modified diol bonded to an isocyanate compound, wherein said isocyanate compound has a structure selected from biuret or isocyanurate structures;

(B) at least one hydroxyl group-containing compound containing two or more hydroxyl groups per one molecule, said hydroxyl group-containing compound being selected from the group consisting of
   (1) a hydroxyl group-containing acrylic resin,
   (2) a hydroxyl group-containing polyester resin,
   (3) a diol of an aliphatic hydrocarbon having 2 to 8 carbon atoms, and
   (4) a hydroxyl group-containing epoxy resin; and (C) a crosslinked polymer fine resin particle having an average particle diameter of 0.01 to 10 μm.

16. The impact-resistant composition as claimed in claim 15, wherein the crosslinked polymer fine resin particle is used in an amount of 0.1 to 40% by weight based on the amount of the composition.

17. An impact resistant composition dissolved or dispersed in an organic solvent or water, said composition consisting essentially of (A) a polyisocyanate having blocked isocyanate groups obtained from a polycaprolactone-modified diol bonded to an isocyanate compound, wherein said isocyanate compound has a structure selected from biuret or isocyanurate structures;

(B) a hydroxyl group-containing acrylic resin or a hydroxyl group-containing polyester resin, each containing two or more hydroxyl groups per molecule, wherein said hydroxyl group-containing acrylic resin or hydroxyl group-containing polyester resin is a polycaprolactone-modified hydroxyl group-containing acrylic resin or a polycaprolactone-modified hydroxyl group-containing polyester resin; and (C) a crosslinked polymer fine resin particle having an average particle diameter of 0.01 to 10 μm.

18. The impact-resistant composition as claimed in claim 17, wherein the crosslinked polymer fine resin particle is used in an amount of 0.1 to 40% by weight based on the amount of the composition.

19. An impact-resistant composition dissolved or dispersed in an organic solvent, said composition consisting essentially of (A) a polyisocyanate having blocked isocyanate groups obtained from a polycaprolactone-modified diol bonded to an isocyanate compound, wherein said isocyanate compound has a structure selected from biuret or isocyanurate structures;

(B) a polyol having 2–8 carbon atoms, a polycaprolactone diol or a polycaprolactone-modified diol; and (C) a crosslinked polymer fine resin particle having an average particle diameter of 0.01 to 10 μm, wherein said polycaprolactone-modified diol of (A) or (B) is a polycaprolactone-modified polyester resin or a polycaprolactone-modified acrylic resin.

20. The impact-resistant composition as claimed in claim 19, wherein the crosslinked polymer fine resin particle is a used in an amount of 0.1 to 40% by weight based on the amount of the composition.

* * * * *

UNITED STATES PATENT AND TRADEMARK OFFICE
CERTIFICATE OF CORRECTION

PATENT NO. : 5,574,102
DATED : November 12, 1996
INVENTOR(S) : TANIGAMI et al.

It is certified that error appears in the above-indentified patent and that said Letters Patent is hereby corrected as shown below:

[30] FOREIGN APPLICATION PRIORITY DATA please delete "Jun. 19, 1992 [JP] Japan ........4-272339" and insert --Sep. 16, 1992 [JP] Japan ............4-272339--.

Signed and Sealed this

Eleventh Day of March, 1997

*Attest:*

BRUCE LEHMAN

*Attesting Officer*     Commissioner of Patents and Trademarks